(12) United States Patent
Sugawara et al.

(10) Patent No.: US 8,892,664 B2
(45) Date of Patent: *Nov. 18, 2014

(54) IMAGE COMMUNICATION APPARATUS, IMAGE COMMUNICATION METHOD, AND MEMORY MEDIUM

(75) Inventors: Kazuhiro Sugawara, Ibaraki (JP); Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,980

(22) Filed: May 9, 2011

(65) Prior Publication Data

US 2011/0213851 A1   Sep. 1, 2011

Related U.S. Application Data

(60) Continuation of application No. 11/685,588, filed on Mar. 13, 2007, now Pat. No. 8,230,022, which is a division of application No. 09/888,547, filed on Jun. 26, 2001, now Pat. No. 7,685,239.

(30) Foreign Application Priority Data

Jun. 28, 2000  (JP) .................................. 2000/194474
Jul. 25, 2000  (JP) .................................. 2000/223706

(51) Int. Cl.
*G06F 15/16* (2006.01)
*G06F 15/173* (2006.01)
*H04N 1/00* (2006.01)
*H04L 12/58* (2006.01)
*H04N 1/32* (2006.01)

(52) U.S. Cl.
CPC ........ *H04L 12/5875* (2013.01); *H04N 1/32106* (2013.01); *H04N 1/00209* (2013.01); *H04N 2201/3221* (2013.01); *H04N 2201/3219* (2013.01); *H04L 51/30* (2013.01); *H04N 2201/3215* (2013.01); *H04N 2201/3208* (2013.01); *H04N 2201/3205* (2013.01); *H04N 2201/3216* (2013.01); *H04N 1/00214* (2013.01); *H04N 2201/3214* (2013.01); *H04N 2201/3202* (2013.01); *H04N 2201/0018* (2013.01); *H04N 2201/3274* (2013.01); *H04N 2201/3209* (2013.01); *H04N 1/00217* (2013.01)
USPC ............ 709/206; 709/203; 709/207; 709/224

(58) Field of Classification Search
USPC ................. 709/206, 224, 230, 207, 203, 204; 358/407, 442; 370/490
See application file for complete search history.

(56) References Cited

U.S. PATENT DOCUMENTS 6,094,277 A   7/2000   Toyoda ......................... 709/200
6,108,688 A   8/2000   Nielsen ......................... 709/206
(Continued)

FOREIGN PATENT DOCUMENTS

EP   0 965 935 A2   12/1999
JP   10-164127   6/1998
JP   11-252348   9/1999

OTHER PUBLICATIONS

R. Fajman, "RFC 2298: An Extensible Message Format for Message Disposition Notifications", Mar. 1998, pp. 1-27.

*Primary Examiner* — Quang N Nguyen
(74) *Attorney, Agent, or Firm* — Fitzpatrick, Cella, Harper & Scinto

(57) ABSTRACT

In an Internet facsimile apparatus, it is an object of the invention to provide means for notifying the user of details of a message disposition notification situation (MDN) of a transmission image. When E-mail data is sent, an MDN for E-mail to be sent is requested and communication management information of the sent E-mail is updated on the basis of a reception result of reply E-mail responsive to the MDN request.

21 Claims, 26 Drawing Sheets

(56) References Cited

U.S. PATENT DOCUMENTS

| | | | |
|---|---|---|---|
| 6,301,016 B1 * | 10/2001 | Matsueda et al. | 358/407 |
| 6,327,046 B1 * | 12/2001 | Miyamoto et al. | 709/206 |
| 6,374,291 B1 | 4/2002 | Ishibashi et al. | 709/206 |
| 6,396,848 B1 * | 5/2002 | Ohta | 370/490 |
| 6,437,873 B1 | 8/2002 | Maeda | 358/1.15 |
| 6,452,688 B1 * | 9/2002 | Suzuki | 358/402 |
| 6,483,600 B1 | 11/2002 | Schuster et al. | 358/1.15 |
| 6,584,466 B1 | 6/2003 | Serbinis et al. | 709/226 |
| 6,594,456 B2 | 7/2003 | Kimizuka et al. | 399/92 |
| 6,618,749 B1 * | 9/2003 | Saito et al. | 709/207 |
| 6,650,440 B1 | 11/2003 | Wing | 358/402 |
| 6,687,742 B1 * | 2/2004 | Iwazaki | 709/206 |
| 6,760,753 B1 * | 7/2004 | Ohgushi et al. | 709/224 |
| 6,775,705 B2 * | 8/2004 | Maeda | 709/230 |
| 6,799,212 B1 | 9/2004 | Iyoki | 709/224 |
| 6,823,367 B1 * | 11/2004 | Wakasugi et al. | 709/206 |
| 6,853,462 B1 | 2/2005 | Yoshida | 358/1.15 |
| 7,023,586 B2 | 4/2006 | Eguchi | 358/402 |
| 7,366,757 B1 * | 4/2008 | Ushida | 709/206 |
| 2001/0005268 A1 | 6/2001 | Eguchi | 358/1.9 |
| 2002/0063904 A1 * | 5/2002 | Suzuki | 358/442 |
| 2005/0021647 A1 | 1/2005 | Maeda | 709/206 |

* cited by examiner

FIG. 6

FAX 0297 12 3456  CANON  1999 12/28 14:51  P. 001
I-FAX aaa@canon.co.jp

```
***********************************
***   COMMUNICATION             ***
***   MANAGEMENT REPORT         ***
***********************************
```

| START | RECEIVER | SENDER | No. | MODE | | PAGES | RESULT | |
|---|---|---|---|---|---|---|---|---|
| *12/28 14:26 | 701928 | | 0001 | SENDING | | 1 | NG | 00'00 #0995 |
| *12/28 14:31 | abc@aaa.bbb.co.jp | efg@ccc.ddd.co.jp | 0002 | SENDING MDN UNRECEIVED | I-FAX | 1 | 0 | 00'07 |
| *12/28 14:31 | nop@aaa.bbb.co.jp | klm@ccc.ddd.co.jp | 0003 | SENDING MDN CONFIRMED | I-FAX | 3 | OK | 00'23 |
| *12/28 14:38 | | | 5001 | AUTO-RECEIVING | G3 | 1 | OK | 00'04 |
| *12/28 14:39 | | | 5002 | AUTO-RECEIVING | I-FAX | 1 | OK | 00'31 |
| *12/28 14:40 | | | 5003 | AUTO-RECEIVING | I-FAX | 1 | OK | 00'21 |
| *12/28 14:40 | | | 5004 | AUTO-RECEIVING | MDN | — | OK | 01'08 |
| *12/28 14:43 | | | 5005 | AUTO-RECEIVING | G3 | 2 | OK | 00'28 |
| *12/28 14:41 | | | 5006 | AUTO-RECEIVING | ECM | 2 | OK | 01'13 |
| *12/28 14:49 | def@aaa.bbb.co.jp | hij@abc.def.co.jp | 0004 | SENDING | I-FAX | 1 | OK | 00'06 |
| *12/28 14:50 | | | 5007 | AUTO-RECEIVING | G3 | 1 | OK | 00'06 |

FIG. 7

I-FAX aaa@canon.co.jp → bbb@canon.co.jp     2000 01/06 10:24     P. 001

```
***********************
***   TRANSMISSION    ***
***  RESULT REPORT    ***
***********************

TRANSMISSION SUCCEEDED.

NO.                0006
RECEIVER ADDRESS   abc@canon.co.jp
RECEIVER NAME      CANON
START              01/06 11:12
DURATION           00' 06
PAGES              1
RESULT             OK [MDN CONFIRMED]
```

FIG. 8

I-FAX aaa@canon.co.jp → abc@canon.co.jp        2000 01/06 10:24        P. 001

```
**************
*** TRANSMISSION ***
*** RESULT REPORT ***
**************
```

TRANSMISSION FAILED.

NO.                 0002
RECEIVER ADDRESS    abc@canon.co.jp
RECEIVER NAME       CANON
START               01/06 11:12
DURATION            00' 06
PAGES               1
RESULT              NG [MDN CONFIRMED]

FIG. 10

| I-FAX aaa@canon.co.jp → bbb@canon.co.jp    2000 01/06 10:24    P.001 |

```
· · · · · · · · · · · · · · · · · · · · · · ·
· · ·RECEPTION RESULT REPORT· · ·
· · · · · · · · · · · · · · · · · · · · · · ·

RECEPTION SUCCEEDED.
                                    ─ 1001
NO.                  5006  ─────
SENDER ADDRESS       abc@canon.co.jp ── 1002
SENDER NAME          CANON
START                01/06 11:12
DURATION             00'06
PAGES                1
RESULT               OK
                     [MDN REQUEST ON] ── 1003
```

FIG. 11

MDN MARK 1101   1102

I-FAX aaa@canon.co.jp → abc@canon.co.jp   [MDN REQUEST ON]   2000 01/06 10:24   P. 001

RECEIVED IMAGE

FIG. 13

MDN MARK
1301

I-FAX aaa@canon.co.jp → abc@canon.co.jp   [MDN SENT]   2000 01/06 10:24   P.001

RECEIVED IMAGE

FIG. 14

FAX 0297 12 3456    CANON
I-FAX aaa@canon.co.jp                                    1999 12/28 14:51    P. 001

```
************************
***  COMMUNICATION   ***
***  MANAGEMENT REPORT ***
************************
```

| START | RECEIVER | SENDER | No. | MODE | | PAGES | RESULT | |
|---|---|---|---|---|---|---|---|---|
| *12/28 14:26 | 701928 | | 0001 | SENDING | | 1 | NG | 00'00 0 #0995 |
| *12/28 14:31 | abc@aaa.bbb.co.jp | efg@ccc.ddd.co.jp | 0002 | SENDING MDN UNSENT | I-FAX | 1 | -- | 00'07 |
| *12/28 14:31 | nop@aaa.bbb.co.jp | klm@ccc.ddd.co.jp | 0003 | SENDING MDN SENT | I-FAX | 3 | OK | 00'23 |
| *12/28 14:38 | | | 5001 | AUTO-RECEIVING | G3 | 1 | OK | 00'04 |
| *12/28 14:39 | | | 5002 | AUTO-RECEIVING MDN UNSENT | I-FAX | 1 | OK | 00'31 |
| *12/28 14:40 | | | 5003 | AUTO-RECEIVING MDN SENT | I-FAX | 1 | OK | 00'21 |
| *12/28 14:40 | | | 5004 | AUTO-RECEIVING | MDN | — | OK | 01'08 |
| *12/28 14:43 | | | 5005 | AUTO-RECEIVING MDN REQUEST OFF | I-FAX | 2 | OK | 00'28 |
| *12/28 14:41 | | | 5006 | AUTO-RECEIVING | ECM | 2 | OK | 01'13 |
| *12/28 14:49 | def@aaa.bbb.co.jp | hij@abc.def.co.jp | 0004 | SENDING | I-FAX | 1 | OK | 00'06 |
| *12/28 14:50 | | | 5007 | AUTO-RECEIVING | G3 | 1 | OK | 00'06 |

FIG. 19

FAX 0297 12 3456   CANON                    1999 12/28 14:51    P. 001
I-FAX aaa@canon.co.jp

```
**********************
*** COMMUNICATION  ***
*** MANAGEMENT REPORT ***
**********************
```

| START | RECEIVER | SENDER | No. | MODE | | PAGES | RESULT | |
|---|---|---|---|---|---|---|---|---|
| *12/28 14:26 | 701928 | | 0001 | SENDING | | 1 | NG | 00'00 0 #0995 |
| *12/28 14:31 | abc@aaa.bbb.co.jp | efg@ccc.ddd.co.jp | 0002 | SENDING | I-FAX | 1 | OK | 00'07 |
| *12/28 14:31 | nop@aaa.bbb.co.jp | klm@ccc.ddd.co.jp | 0003 | SENDING | I-FAX | 3 | NG | 00'23 |
| *12/28 14:38 | | | 5001 | AUTO-RECEIVING | G3 | 1 | OK | 00'04 |
| *12/28 14:39 | | | 5002 | AUTO-RECEIVING | I-FAX | 1 | OK | 00'31 |
| *12/28 14:40 | | | 5003 | AUTO-RECEIVING | I-FAX | 1 | OK | 00'21 |
| *12/28 14:40 | | | 5004 | AUTO-RECEIVING | DSN | — | OK | 01'08 |
| *12/28 14:43 | | | 5004 | AUTO-RECEIVING | G3 | 2 | OK | 00'28 |
| *12/28 14:41 | | | 5006 | AUTO-RECEIVING | ECM | 2 | OK | 01'13 |
| *12/28 14:49 | def@aaa.bbb.co.jp | hij@abc.def.co.jp | 0004 | SENDING | I-FAX | 1 | -- | 00'06 |
| *12/28 14:50 | | | 5007 | AUTO-RECEIVING | G3 | 1 | OK | 00'06 |

FIG. 20

I-FAX aaa@canon.co.jp → bbb@canon.co.jp    2000 01/06 10:24    P. 001

```
**********************
*** TRANSMISSION ***
*** RESULT REPORT ***
**********************

TRANSMISSION SUCCEEDED.

NO.                 0006
RECEIVER ADDRESS    abc@canon.co.jp
RECEIVER NAME       CANON
START               01/06 11:12
DURATION            00' 06
PAGES               1
RESULT              OK
```

FIG. 21

I-FAX aaa@canon.co.jp → abc@canon.co.jp        2000 01/06 10:24        P. 001

```
*****************************
***  TRANSMISSION         ***
***  RESULT REPORT        ***
*****************************
```

TRANSMISSION FAILED.

| | |
|---|---|
| NO. | 0002 |
| RECEIVER ADDRESS | abc@canon.co.jp |
| RECEIVER NAME | CANON |
| START | 01/06 11:12 |
| DURATION | 00' 06 |
| PAGES | 1 |
| RESULT | NG |
| | #0018 FAILED TO CONNECT TO SERVER. |

FIG. 23

I-FAX aaa@canon.co.jp → bbb@canon.co.jp    2000 01/06 10:24    P.001

```
***************************
***  TRANSMISSION       ***
***  RESULT REPORT      ***
***************************

MAIL SERVER RETURNED ERROR NOTIFICATION.

NO.                  0006
RECEIVER ADDRESS     abc@canon.co.jp
RECEIVER NAME        CANON
START                01/06 11:12
DURATION             00' 06
PAGES                1
RESULT               NG            ACTION : FAILED
```

FIG. 24

I-FAX aaa@canon.co.jp → abc@canon.co.jp                2000 01/06 10:24        P. 001

```
*****************************
 *** RECEPTION
     RESULT REPORT ***
*****************************

ABNORMAL DSN MAIL WAS RECEIVED.

NO.                 0002
SENDER ADDRESS      abc@canon.co.jp
SENDER NAME         CANON
START               01/06 11:12
DURATION            00'06
PAGES               1
RESULT              ACTION: DSN WITHOUT HEADER
```

FIG. 26

| NO. | SEND/RECEIVE | TO | RESULT | CONFIRMATION REQUIRED | |
|---|---|---|---|---|---|
| 0001 | SEND | aaa.zzz.canon.co.jp | OK | — | |
| 0002 | SEND | bbb.zzz.canon.co.jp | OK | T.37(S) ○ | T.37(F) — |
| 0003 | SEND | 03-3111-2222 | OK | — | |
| 0004 | SEND | hhh.yyy.canon.co.jp | OK | — | |
| 0005 | SEND | ddd.zzz.canon.co.jp | OK | ○ | |
| 0006 | SEND | eee.zzz.canon.co.jp | OK | — | |
| 0007 | SEND | 03-3111-1111 | OK | — | |
| 0008 | SEND | ccc.zzz.canon.co.jp | OK | ○ | |
| 0009 | SEND | 03-3333-3333 | OK | — | |
| 0010 | SEND | aaa.zzz.canon.co.jp | NG | ERROR | |

IMAGE COMMUNICATION APPARATUS, IMAGE COMMUNICATION METHOD, AND MEMORY MEDIUM

RELATED APPLICATIONS

This application is a continuation of U.S. application Ser. No. 11/685,588, filed Mar. 13, 2007, which is a divisional of U.S. application Ser. No. 09/888,547, filed Jun. 26, 2001, which issued as U.S. Pat. No. 7,685,239 on Mar. 23, 2010, the entire contents of which are incorporated herein by reference.

BACKGROUND OF THE INVENTION

1. Field of the Invention

The invention relates to an image communicating apparatus which can transmit and receive E-mail through a network such as Internet or the like and, more particularly, to a delivery status notification or a message disposition notification of an image transmitted by E-mail.

2. Related Background Art

In recent years, an Internet facsimile apparatus has been proposed as an image communicating apparatus which can transmit and receive E-mail through a network such as Internet or the like. In the Internet facsimile apparatus, read image data is transmitted as an image to a receiver by a method whereby it is attached as a file to the E-mail.

The transmitted E-mail is sent to the receiver on the destination side through one or more mail servers on the network by a store-and-forward system. Therefore, a transmission result of the image data in the Internet facsimile apparatus is merely nothing but a transmission result to the mail servers. Whether the image data has certainly been delivered to the receiver or not and, further, whether the contents of the image have been read by a person who receives or not cannot be confirmed from the contents disclosed in a communication management report or a transmission result report.

SUMMARY OF THE INVENTION

It is an object of the invention to realize a message disposition notification of a transmission image in an Internet facsimile apparatus. That is, it is an object of the invention to provide means for notifying the user of details of a message disposition notification situation or a delivery status notification situation of a transmission image in an Internet facsimile apparatus on a transmitter side.

It is another object of the invention to provide effective means for sending a message disposition notification of a received image to the transmitter side in the Internet facsimile apparatus on a receiver side.

To accomplish the above objects, according to the invention, there is provided an image communicating apparatus which is connected to a network capable of communicating E-mail and has an E-mail communicating function, comprising: E-mail transmitting means for sending E-mail data accompanied by an image file; requesting means for requesting reply E-mail corresponding to the sent E-mail when the E-mail data is sent by the E-mail transmitting means; communication managing means for managing transmission information of each transmitted E-mail data; and control means for updating the transmission information which is managed by the communication managing means on the basis of a reception result of the reply E-mail corresponding to the sent E-mail.

Preferably, there is provided an image communicating apparatus which is connected to a network capable of communicating E-mail and has an E-mail communicating function, comprising: E-mail receiving means for receiving E-mail data accompanied by an image file; detecting means for detecting control information for requesting reply E-mail from the E-mail data received by the E-mail receiving means; and notifying means for notifying the detection of the control information by visualizing means or monitoring means.

The above and other objects and features of the present invention will become apparent from the following detailed description and the appended claims with reference to the accompanying drawings.

BRIEF DESCRIPTION OF THE DRAWINGS

FIG. 6 is a diagram showing an example of an output of a communication management report in the Internet facsimile apparatus in the first embodiment;

FIG. 7 is a diagram showing an example of an output of a transmission result report in the Internet facsimile apparatus in the first embodiment;

FIG. 8 is a diagram showing an example of the output of the transmission result report in the Internet facsimile apparatus in the first embodiment;

FIG. 10 is a diagram showing an example of an output of a reception result report in the Internet facsimile apparatus in the second embodiment;

FIG. 11 is a diagram showing an example of an output of a received image in the Internet facsimile apparatus in the second embodiment;

FIG. 13 is a diagram showing an example of an output of a received image in the Internet facsimile apparatus in the third embodiment;

FIG. 14 is a diagram showing an example of an output of a communication management report in the Internet facsimile apparatus in the third embodiment;

FIG. 19 is a diagram showing an example of an output of a communication management report in the Internet facsimile apparatus in the fourth embodiment;

FIG. 20 is a diagram showing an example of a transmission result report which is outputted in step S1705 in FIG. 17;

FIG. 21 is a diagram showing an example of a transmission result report which is outputted in step S1709 in FIG. 17;

FIG. 23 is a diagram showing an example of a transmission result report which is outputted in step S2207 in FIG. 22;

FIG. 24 is a diagram showing an example of a reception result report which is outputted in step S2209 in FIG. 22;

FIG. 26 is a diagram showing an example of a communication management report which is outputted in the Internet facsimile apparatus in the sixth embodiment.

DETAILED DESCRIPTION OF THE PREFERRED EMBODIMENTS

Embodiments of the invention will now be described in detail hereinbelow with reference to the drawings.

A construction of an Internet facsimile apparatus in the embodiment will be first described.

Figure 1:
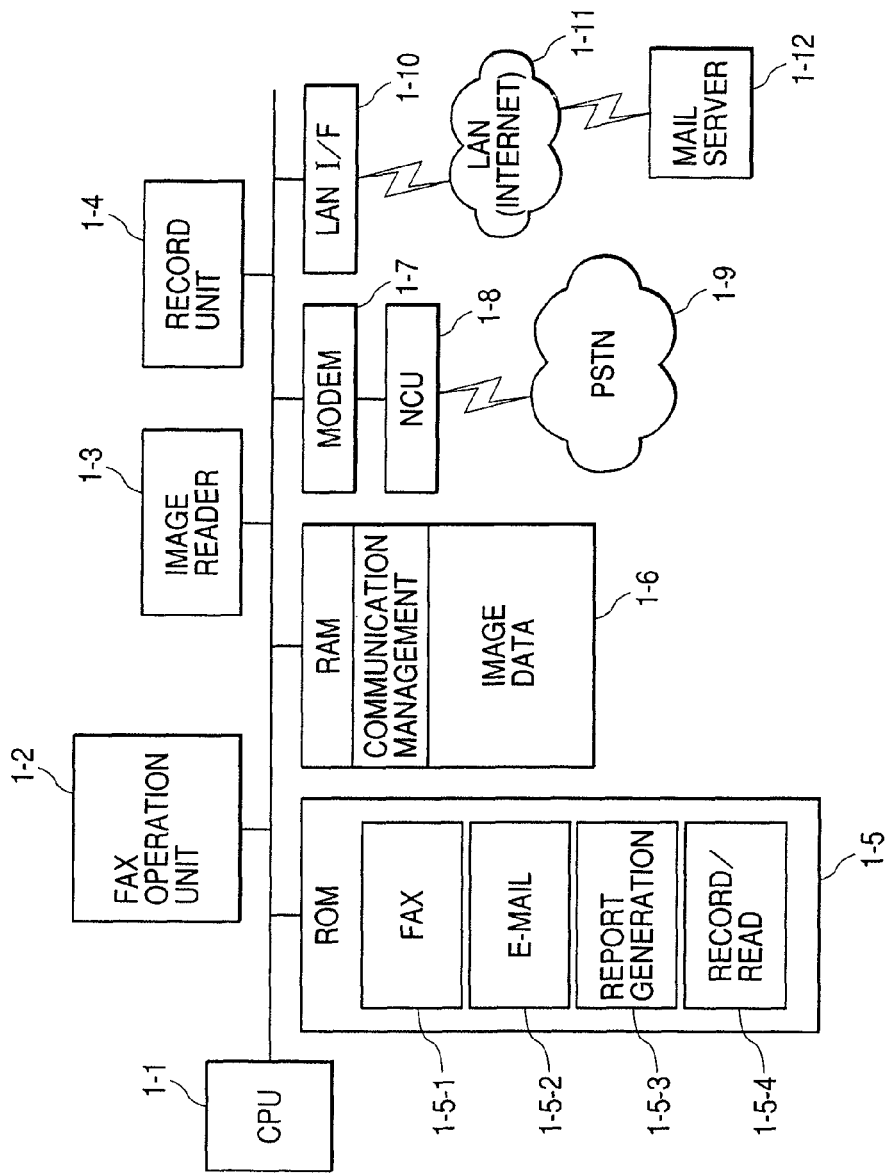
FIG. 1 is a block diagram showing a construction of an Internet facsimile apparatus in an embodiment of the invention.

FIG. 1 is a block diagram showing a construction of the Internet facsimile apparatus in the embodiment of the invention.

In FIG. 1, reference numeral 1-1 denotes a CPU for controlling the facsimile.

Reference numeral 1-2 denotes an FAX operation unit of the facsimile apparatus. The FAX operation unit 1-2 is constructed by an LCD, an LED, a key panel for inputting, and the like and enables the inputting operation such as communication, recording, or the like of the facsimile. Sound source means such as a speaker or the like for ringing an alarm is also arranged.

Reference numeral 1-3 denotes an image reader for reading an image of a facsimile original to be sent.

Reference numeral 1-4 denotes a record unit for outputting received image data or a main sentence of E-mail, various reports, and the like.

Reference numeral 1-5 denotes an ROM as a memory medium in which programs for controlling the facsimile and data according to the embodiment of the invention have been stored. The programs for controlling facsimile transmission and reception, transmission and reception of the E-mail, generation, recording, and reading of the reports, the user I/F, and the like have been stored in the ROM 1-5.

Reference numeral 1-6 denotes an RAM for storing various information of the facsimile. Communication management information, image data, and the like which are generated upon transmission and reception have been stored in the RAM 1-6.

Reference numeral 1-7 denotes an MODEM as a modulating and demodulating circuit for performing the transmission and reception of the facsimile to/from a public line (PSTN or ISDN) 1-9.

Reference numeral 1-8 denotes a network control unit (NCU) for the PSTN 1-9.

Reference numeral 1-11 denotes an LAN or Internet which can exchange the E-mail data. In case of the LAN, it is connected to the Internet through a firewall, a service provider, or the like.

Reference numeral 1-10 denotes an I/F unit for connecting to the LAN (Internet) 1-11.

Reference numeral 1-12 denotes a mail server connected through the LAN or Internet.

With respect to the E-mail transmission using the Internet facsimile apparatus according to Claims of the present invention, a destination (receiver) is designated by the FAX operation unit 1-2, an image of an original to be sent is read by the image reader 1-3, and the E-mail accompanied by the read image is sent by an E-mail transmission control program. It is assumed that the details of a format of the E-mail, a compressing method of the annexed image, and the like are based on the ITU-T.37 (recommendation of the facsimile transmission through the Internet).

As a first embodiment, the operation on a transmitter side for sending Internet facsimile data with a message deposition notification will be described hereinbelow. As a second embodiment, the operation on a receiver side for receiving the Internet facsimile data with a message deposition notification will be described hereinbelow.

<First Embodiment>

As a first embodiment, the operation on the transmitter (hereinbelow, referred to as an Internet facsimile apparatus in the first embodiment) side for sending the Internet facsimile data with a message deposition notification will be described hereinbelow.

First, a managing method of communication result information in the Internet facsimile apparatus in the first embodiment will be described.

In the Internet facsimile apparatus in the embodiment, a result of the facsimile transmission and reception and a result of the transmission and reception of the E-mail are stored and managed as communication management information.

Figure 2:
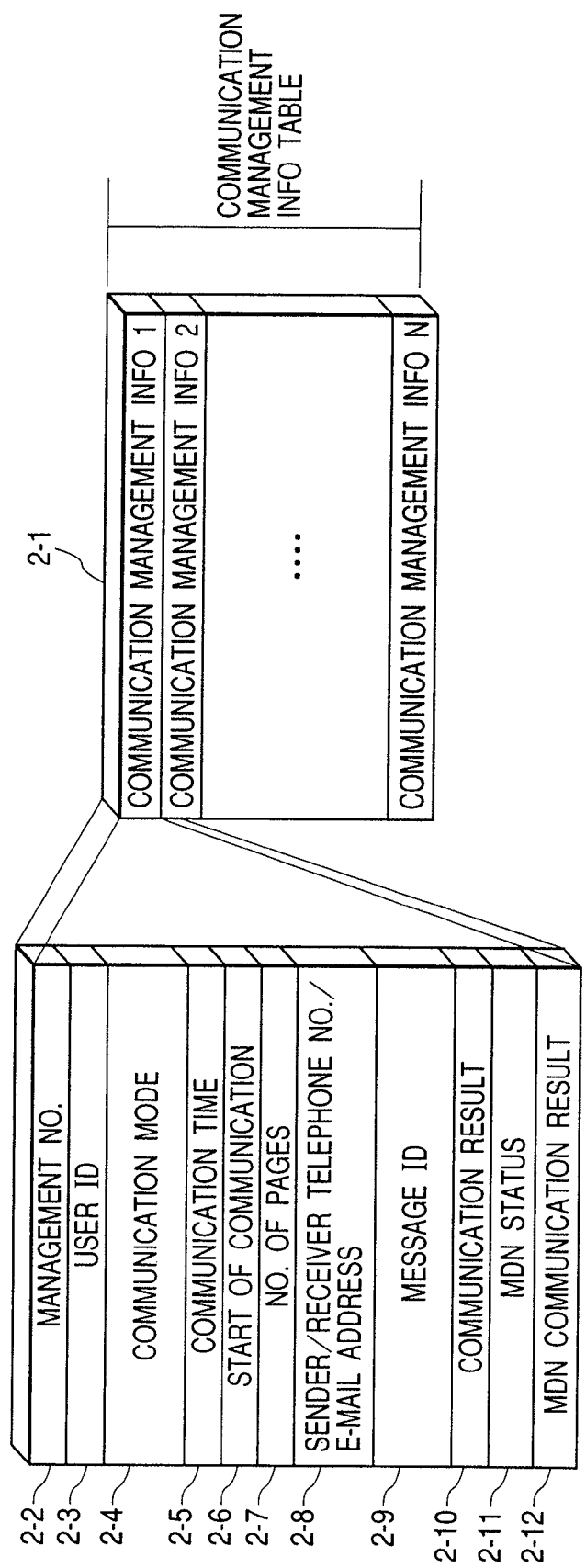
FIG. 2 is a diagram showing a data construction of communication management information of a facsimile in the first embodiment.

FIG. 2 shows a data construction of the communication management information of the facsimile in the first embodiment.

Reference numeral 2-1 denotes a communication management information table for storing the communication management information which is formed each time the transmission and reception of the facsimile or the transmission and reception by the E-mail are executed. Information shown at 2-2 to 2-12 is stored in each communication management information in the communication management information table 2-1.

Communication management numbers are stored in the information 2-2, that is, serial numbers 1 to 4999 are assigned upon transmission and serial numbers 5001 to 9999 are assigned upon reception.

A user ID, that is, a user name and a sender name upon facsimile transmission and information described in a From: field column upon transmission of the E-mail are stored in the information 2-3.

Communication mode such as transmission or reception, FAX sending/receiving mode such as G3, ECM, or the like, I-FAX (facsimile transmission by the E-mail), and the like are stored in the information 2-4.

A communication time is stored in the information 2-5. In case of the transmission and reception via the LAN, it becomes a time of connection to the server.

A time when the communication is started is stored in the information 2-6.

The number of originals (pages) which are sent or received is stored in the information 2-7. If the E-mail without an image is received, information indicative of the absence of the page number information is stored.

A telephone number of the receiver on the partner side or an E-mail address of the receiver is stored in the information 2-8.

A message ID written in "Message-ID:" of a mail header upon transmission of the E-mail and a message ID written in "Message-ID:" of a mail header upon reception are stored in the information 2-9.

In order to unconditionally identify the E-mail on the Internet, the ID written in the "Message-ID:" is formed by combining an IP address and a domain name on the sender side, a sending time, a communication management number, and the like.

Information indicative of a communication result is stored in the information 2-10. In case of the G3 communication via the PSTN, its communication result is stored. In case of the Internet FAX transmission, a communication result until the default mail server is stored.

A message disposition notification (hereinafter, abbreviated to "MDN") status of the transmitted E-mail is stored in the information 2-11. For example, there are the following MDN statuses.

"MDN Request OFF" denotes that the message disposition notification (MDN) is not requested. "MDN Request ON" denotes that the MDN has been requested and it is being notified. "MDN Confirmed" denotes that the E-mail according to the requested MDN has been received.

MDN communication result information, that is, a reply result on the reception side corresponding to the MDN in the case where the MDN has been requested is shown in the information 2-12.

In the example shown in FIG. 2, the communications in the different communication modes such as transmission/reception or G3 FAX communication/Internet FAX communication are managed by one table. However, they can be also managed by a different table every communication mode.

An E-mail sending process in the Internet facsimile apparatus in the embodiment will now be described.

Figure 3:
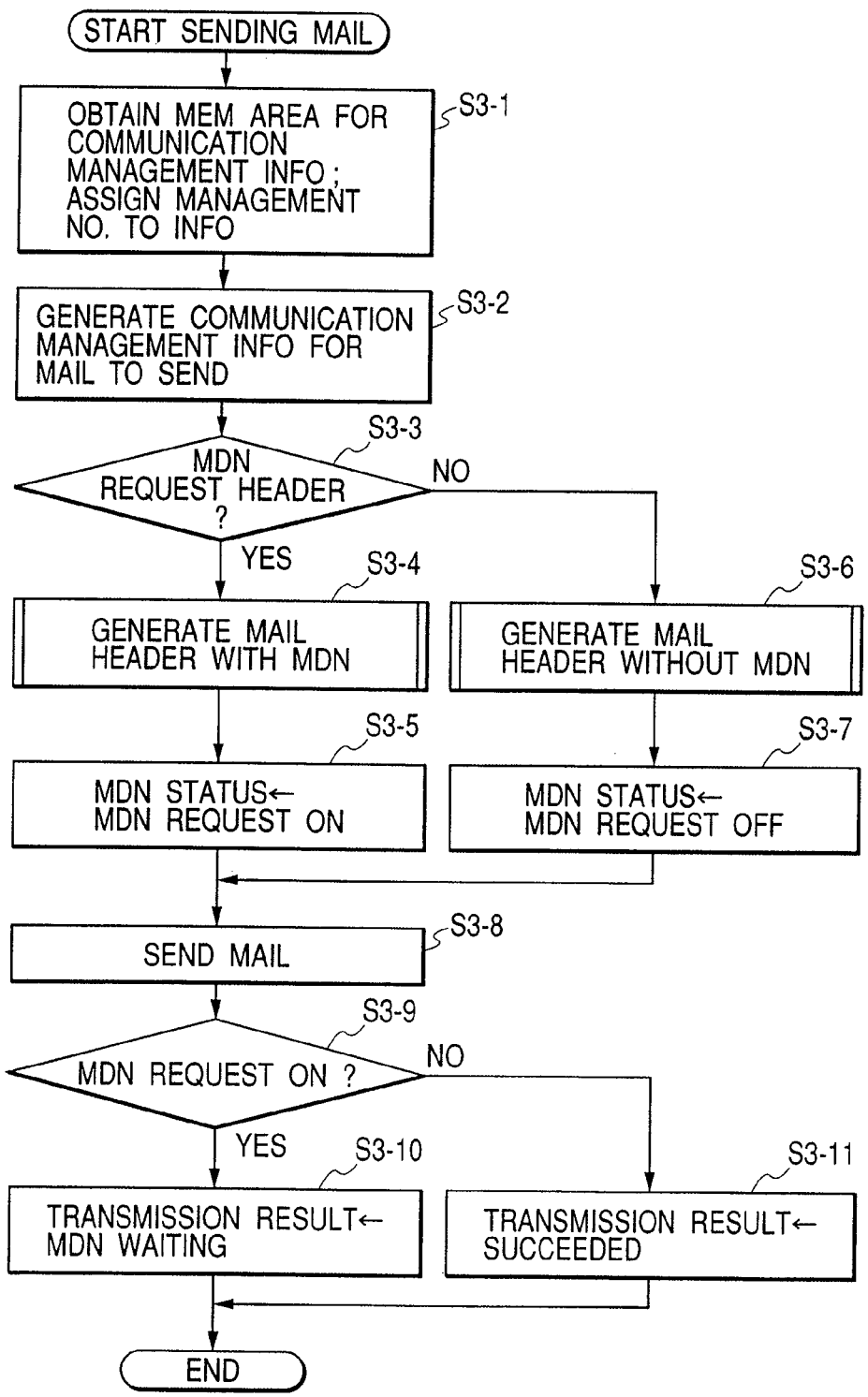
FIG. 3 is a flowchart showing an E-mail sending process in the Internet facsimile apparatus in the first embodiment.

FIG. 3 is a flowchart showing the E-mail sending process in the Internet facsimile apparatus in the first embodiment.

First, in step S3-1, one area for storing the communication management information is obtained from the communication management table at the start of the transmission. If there is no empty area, the oldest communication management information is overwritten and held. The communication management number 2-2 is assigned to the communication management information in the obtained area.

In step S3-2, the communication management information for the mail to be sent is generated. Specifically speaking, a message ID is formed as a unique ID for identifying the mail to be sent, the communication mode is set to the I-FAX transmission indicative of the Internet FAX transmission, and the communication start time, the number of pages, the E-mail address of the receiver, and an error code (communication result: Unsent) are set.

In step S3-3, whether the message disposition notification (MDN) is performed or not, that is, whether the MDN request header is attached or not is discriminated. If it is attached, step S3-4 follows. If NO, step S3-6 follows.

It is now assumed that the setting about whether the MDN is performed or not has been made by the user through the FAX operation unit 1-2 prior to the discrimination in step S3-3.

In step S3-4, a mail header accompanied by an MDN request header ("Disposition-Notification-To: <sender address>") is generated.

In step S3-5, the "MDN-Request ON" status is written into the MDN status 2-11 of the communication management information.

In step S3-6, a header of the sent mail without the MDN request header is generated.

In step S3-7, information of "MDN Request OFF" is written into the MDN status 2-11 of the communication management information.

In step S3-8, the sending process of the E-mail accompanied by the image file to be sent to the mail server is executed.

In step S3-9, when the transmission of the mail to the mail server is completed, the value of the MDN status of the communication management information is read out. If it indicates "MDN Request ON", step S3-10 follows. If it does not indicate "MDN Request ON", step S3-11 follows.

In step S3-10, "MDN Receiving" is written into the transmission result and the communication management information is updated.

In step S3-11, "Succeeded" is written into the transmission result and the communication management information is updated.

By the above processes, the communication management information of the transmission of the E-mail is set into the communication management information table 2-1.

An E-mail receiving process in the Internet facsimile apparatus of the embodiment will now be described.

The receiving process of the E-mail in the embodiment is executed by making a confirmation of the received mail to the mail server at a predetermined period by the setting on the apparatus side.

Figure 4:
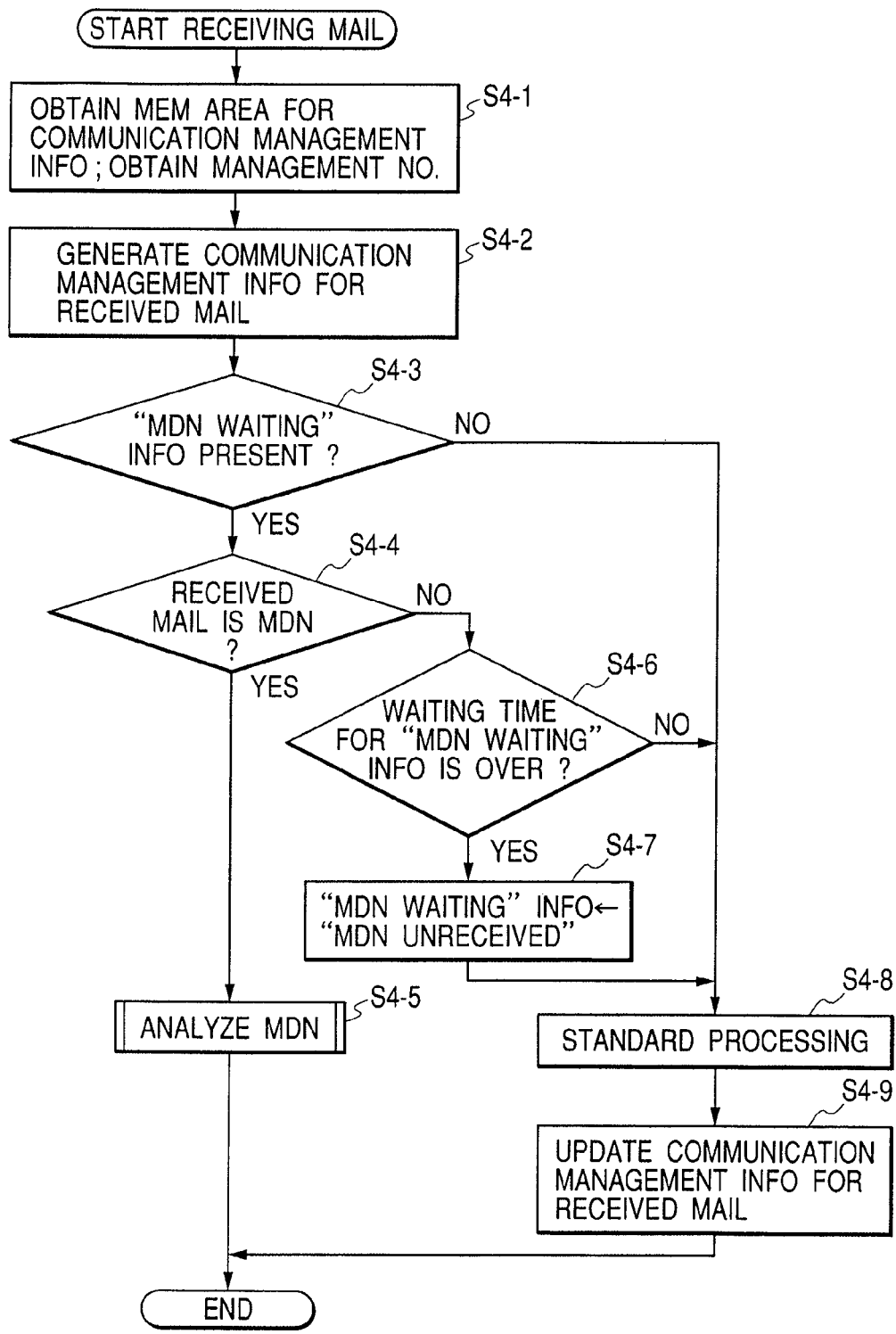
FIG. 4 is a flowchart showing processes of received E-mail in the Internet facsimile apparatus in the first embodiment.

FIG. 4 is a flowchart showing processes of the received E-mail in the Internet facsimile apparatus in the first embodiment. The processes based on the flowchart of FIG. 4 are executed with respect to each E-mail received from the mail server.

In step S4-1, an area for storing the communication management information for the received mail is obtained and the communication management number is obtained.

In step S4-2, the message ID is obtained from the header portion of the received mail and the communication management information is generated in a manner similar to step S3-2.

In step S4-3, the communication management information table 2-1 is searched and whether there is the communication management information of "MDN Receiving" or not is discriminated. If it exists, step S4-4 follows. If NO, step S4-8 follows.

In step S4-4, whether the received E-mail is the MDN responsive to the MDN request or not is discriminated. If YES, step S4-5 follows. If NO, step S4-6 follows.

In step S4-5, an analyzing process of the received MDN is executed and the communication management information of the sent E-mail corresponding to the received MDN is updated. The details of the process in step S4-5 will be described hereinlater with reference to FIG. 5.

Step S4-6 relates to a case where although there is the mail of "MDN Receiving", the received mail is not the MDN. In this step, whether a waiting time of the communication management information of "MDN Receiving" is over or not is discriminated. If YES, step S4-7 follows. If NO, step S4-8 follows.

In step S4-7, "MDN Unreceived" is written as a communication result of the communication management information regarding the sent mail which made the MDN request. Further, a corresponding error code is set.

In step S4-8, since it is not the MDN mail, a predetermined process is executed. As such a predetermined process, for example, there is a process such that the image data attached to the received E-mail is outputted or printed, or received into a memory, or transferred to another apparatus, or the like.

In step S4-9, the communication management information of the received mail is updated on the basis of the result processed in step S4-8 or a corresponding error code is set.

The updating process of the communication management information of the received E-mail is executed by the above processes.

The details of the analyzing process of the received MDN in step S4-5 will now be described with reference to FIG. 5.

In step S5-1, the data of one line is obtained from the received E-mail.

In step S5-2, whether a head character string is "Original-Message-ID:" as a header indicative of the message ID of the sending E-mail corresponding to the MDN or not is discriminated. If NO, the processing routine is returned to step S5-1 and the data of the next line is obtained. If YES, step S5-3 follows.

In step S5-3, the message ID shown in (S5-2) is found from the message IDs of the communication management information regarding the sent mail.

In step S5-4, if the relevant message ID is found, an area of the communication management information is specified by a pointer or the like and step S5-5 follows. If it is not found, step S5-10 follows.

In step S5-5, the data of another one line is further obtained from the received E-mail. In step S5-6, whether a head character string of the obtained line data is "Disposition:" or not is discriminated. If YES, step S5-7 follows. If NO, the processing routine is returned to step S5-5 and the data of the next one line is obtained.

In step S5-7, the contents of the communication result information 2-12 of the communication management information specified in step S5-4 are updated on the basis of the contents of the header of "Disposition:".

Parameters which are set into the header of "Disposition:" have been defined in RFC2298.

An action-mode indicates whether the processes regarding the MDN have automatically been executed or manually been executed ("manual-action"/"automatic-action").

A sending-mode indicates whether the transmission of the MDN has manually been executed or automatically been executed ("MDN-sent-manually"/"MDN-sent-automatically").

A disposition-type indicates how the sent E-mail was processed on the reception side UA. Specifically speaking, there are the following processing methods: "displayed"; "some process such as printing, transfer, or the like has been made ("dispatched"); "the predetermined process has been executed ("processed"); "deleted"; "denied"; and "failed".

As mentioned above, in the RFC2298, since the parameters according to the processes of the E-mail on the reception side are set into the Disposition header, whether the MDN of the sent-E-mail has been made on the basis of a predetermined rule or not is discriminated. A discrimination result is reflected to the MDN communication result information 2-12.

In step S5-8, whether the reading line is the last line or not is discriminated. If YES, step S5-9 follows. If NO, the processing routine is returned to step S5-5 and whether the next line is the last line or not is discriminated.

In step S5-9, if there is not a "Disposition:" field in the MDN, this means that the received MDN mail is not normal. Information indicative of the reception error is set into the MDN communication result information 2-12 of the received MDN mail. If the E-mail for notifying the error is returned from the mail server because the address of the sent E-mail is wrong, or the like, the process in this step is executed.

In step S5-10, since there is not the relevant message ID, information indicative of the reception error is set into the MDN communication result information 2-12 of the received MDN mail.

Figure 5:
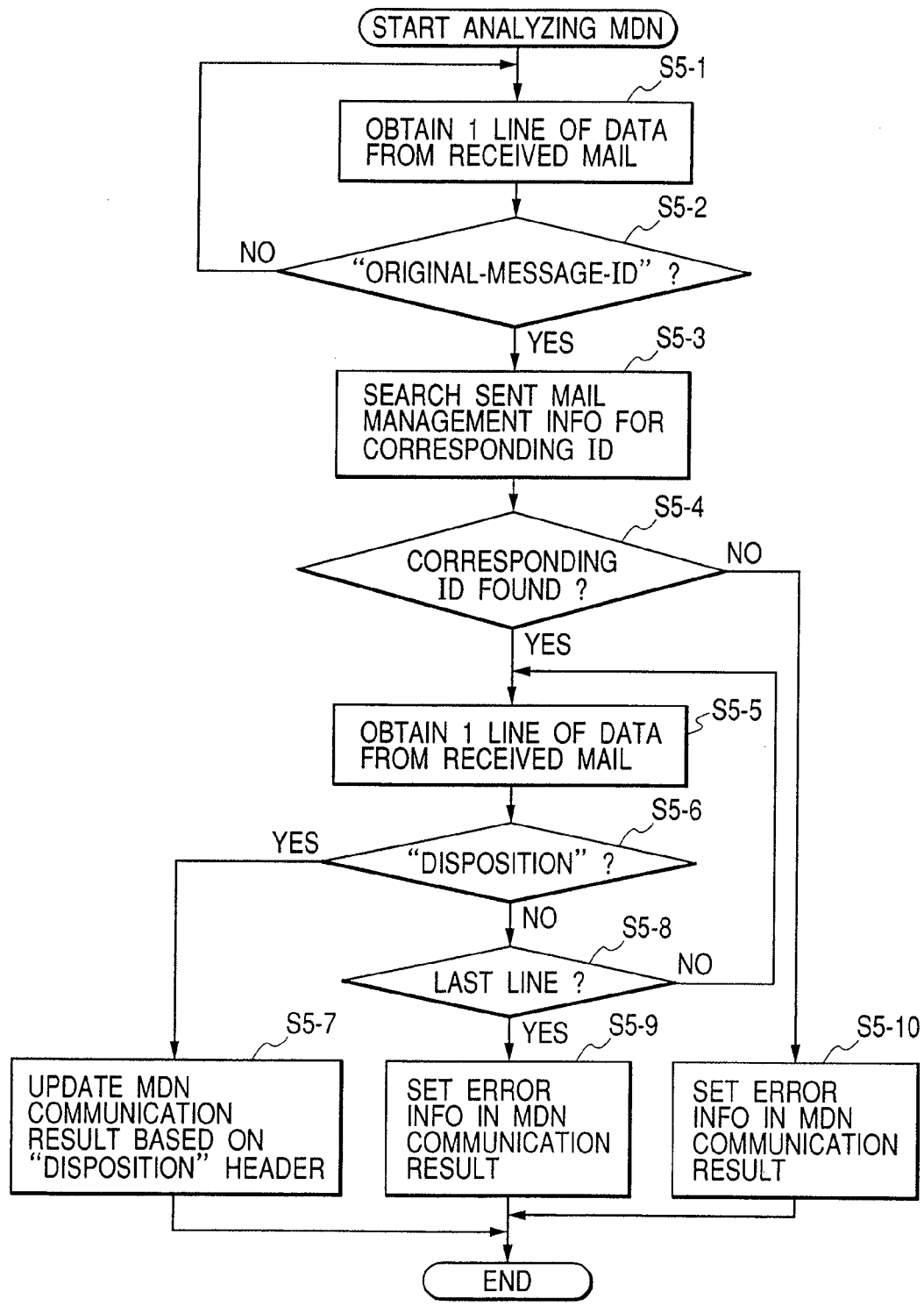
FIG. 5 is a flowchart showing an analyzing process of a received MDN in the Internet facsimile apparatus in the first embodiment.

Each of the process in step S4-9 in FIG. 4, the process in step S5-9 in FIG. 5, and the process in step S5-10 is the process for setting the error into the communication management information because the MDN reply mail cannot be received due to a different factor. However, an error code for identifying each error factor is set and visually outputted by a report or the like. Thus, the sender of the E-mail can verify the errors in detail.

FIG. 6 is a diagram showing an output example of a communication management report in the Internet facsimile apparatus of the first embodiment. The communication management report is outputted on the basis of the contents stored in the communication management information table 2-1. In the example of the diagram, in the case where data is FAX transmitted by E-mail (that is, when data is Internet FAX transmitted), "send I-FAX" is written in the column of the communication mode. In this example, "send I-FAX" of three cases is written.

In the first case of No. 0002, by displaying "MDN Unsent" into the communication mode, it is shown that the MDN is not received yet. By displaying "--" into the column of the communication result, it is shown that the result is not sent.

In the next case of No. 0003, by displaying "MDN Confirmed" into the communication mode, it is shown that the MDN has already been made. OK is written in the column of the communication result.

In the last case of No. 0004, by displaying nothing regarding the MDN into the column of the communication mode, it is shown that the MDN is not requested. Only OK is written in the column of the communication result.

As mentioned above, when the communication management report is outputted, since the presence or absence (ON/OFF) of the MDN request and the MDN situation at an output time point are displayed every communication, the user can grasp the MDN situation of each communication.

In the example of FIG. 6, OK/NG which is set into the column of the communication result of the Internet FAX transmission is printed as one communication result by combining the transmission result until the mail server and the MDN communication result. That is, OK is printed only in the case where both the transmission result until the mail server and the MDN communication result indicate the normal end.

As a modification, the transmission result until the mail server and the MDN communication result can be also printed into the different columns.

FIGS. 7 and 8 show examples of outputs of the transmission result reports in the case where the Internet FAX transmission with "MDN Request ON" is performed. FIG. 7 shows the example in the case where the communication result indicates OK and the MDN has already been made. FIG. 8 shows the example in the case where the communication result indicates NG and the MDN has already been made.

In the example of FIG. 7, the transmission result is set to OK from the contents of the "Disposition:" header in the MDN analyzing process in FIG. 5, the communication management information is updated (step S5-7), and it is outputted as a transmission result report.

With respect to an output timing of the transmission result, it is assumed that the transmission result report is not outputted until the MDN mail is received. After the elapse of the time which has been determined due to the waiting for reception of the MDN mail (step S4-6), the status is set to "MDN Unreceived", and the transmission result report is outputted as a transmission error.

In the example of FIG. 8, the transmission result is set to NG from the contents of the "Disposition:" header in the MDN analyzing process in FIG. 5, the communication management information is updated (step S5-7), and it is outputted as a transmission result report.

As mentioned above, according to the first embodiment, when the Internet FAX transmission of "MDN Request ON" is performed, a reply situation for the MDN can be reflected in detail to the communication management information and printed or displayed.

Thus, the sender of the Internet facsimile can correctly grasp the contents of the communication situation and communication result of the Internet FAX transmission and a kind Internet FAX apparatus which can be easily understood by the user can be provided.

Although the above first embodiment has been shown with respect to the example of notifying the sender of the communication management information to which the MDN reply situation from the receiver has been reflected in a form of the report output, the communication management information can be also displayed on the FAX operation unit 1-2.

Further, it is also possible to allow the construction of the Internet FAX apparatus shown in FIG. 1 to have a Web server function for opening various data to Web clients on the LAN 1-11, convert the communication management information into an XML or HTML format, and it is opened to the user on the LAN 1-11 by the Web server function.

<Second Embodiment>

As a second embodiment, the operation on the receiver side for receiving the Internet facsimile data of "MDN Request ON" will now be described.

It is now assumed that the Internet FAX apparatus on the receiver side (hereinafter, referred to as an Internet facsimile apparatus in the second embodiment) manages each reception by the communication management information table 2-1 in a manner similar to the Internet FAX apparatus in the first embodiment shown in FIG. 2.

Figure 9:
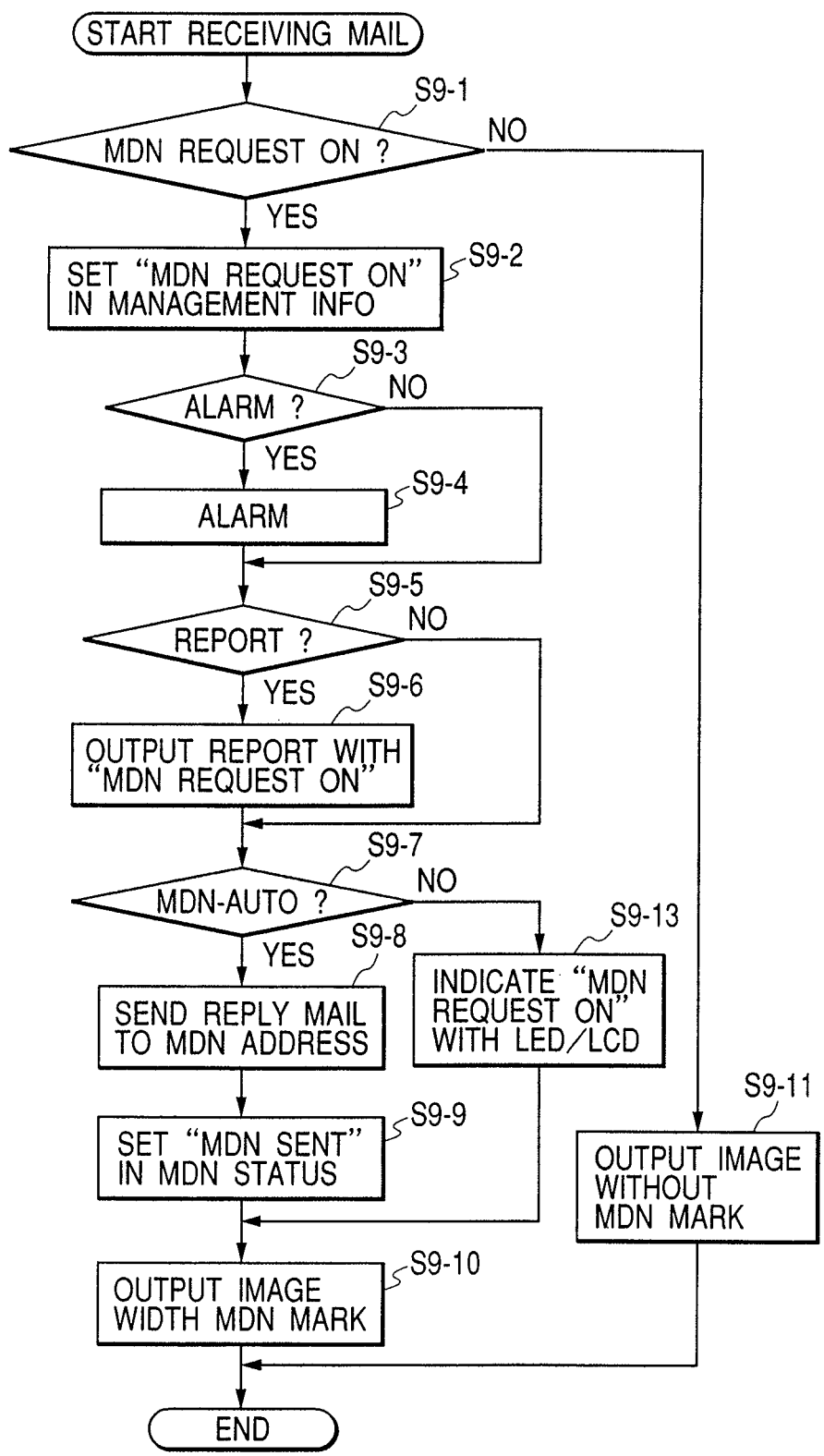
FIG. 9 is a flowchart showing the operation in the case where E-mail of a request header ON of a message disposition notification in an Internet facsimile apparatus in the second embodiment is received.

FIG. 9 is a flowchart showing the operation in the case where the E-mail of "MDN Request Header ON" is received in the Internet FAX apparatus in the second embodiment.

First, an area of the communication management information table 2-1 is obtained and the information regarding the received E-mail (information of 2-2 to 2-12 in FIG. 2) is set into the obtained area. At this time, information indicative of the absence of the MDN request is set into the MDN status 2-11.

In step S9-1, whether the MDN request is ON or not is discriminated. This discrimination is made by checking whether the mail header accompanied by the MDN request header ("Disposition-Notification-To: <sender address>") based on RFC2298 is ON or not. If the MDN request header is ON, step S9-2 follows. If it is OFF, step S9-11 follows.

In step S9-2, information indicative of the MDN request ON is set into the MDN status 2-11 by the communication management information table 2-1 of the received E-mail.

In step S9-3, whether an alarm is generated or not is discriminated on the basis of the user registration information showing "process in the case where the E-mail of "MDN Request ON" is received" which has previously been registered in the RAM 1-6. In case of generating the alarm, step S9-4 follows. If NO, step S9-5 follows.

In step S9-4, the alarm indicative of "MDN Request ON" is generated by a speaker provided for the FAX operation unit 1-2.

In step S9-5, whether the reception result report is outputted or not is discriminated on the basis of the user registration information showing "process in the case where the E-mail of "MDN Request ON" is received" which has previously been registered in the RAM 1-6. In case of outputting the reception result report, step S9-6 follows. If NO, step S9-7 follows.

In step S9-6, the reception result report accompanied by the information of "MDN Request ON" is outputted. An example of the output of the reception result report will be explained hereinlater.

In step S9-7, whether the MDN is automatically returned or not is discriminated on the basis of the user registration information showing "process in the case where the E-mail of "MDN Request ON" is received". In case of automatically returning the MDN, step S9-8 follows. If NO, step S9-13 follows.

In step S9-8, a reply E-mail of the MDN is generated and sent to an MDN notification destination address set in "Disposition-Notification-Header".

In step S9-9, after the transmission, information showing that the MDN reply E-mail has been sent to the MDN status 2-11, that is, the E-mail of the MDN has already been sent is set.

In step S9-13, "MDN Request ON" is displayed by the LED or LCD of the FAX operation unit 1-2, the LED is lit on to indicate the presence of the memory received image, the received E-mail is stored into the memory, and the process of the received E-mail is finished.

In step S9-10, a mark (MDN mark) indicative of "MDN Request ON" is added to the header of the image attached to the received E-mail and the resultant image is outputted. Generally, a technique for synthesizing a predetermined mark to the received FAX image and outputting the resultant image is well known. In the embodiment as well, the above process is realized by a technique similar to such a known technique. The output example of the image will be described hereinbelow.

In step S9-11, a header without the MDN mark is added to the image attached to the received E-mail and the resultant image is outputted.

The operation in the case where the E-mail of "MDN Request Header ON" is received has been described in the above flowchart.

It should be noted here that before the contents of the received E-mail and the image attached to the received E-mail are visually outputted, that is, in step S9-4, S9-6, S9-10, or S9-13, the user is notified of the fact that the MDN request is ON.

Thus, the user can discriminate that the MDN request is ON without confirming the contents of the received E-mail and can promptly return the MDN to the sender.

Various modifications of the flowchart shown in FIG. 9 are possible. For example, first and second modifications will now be described hereinbelow with reference to a flowchart of FIG. 12 (obtained by modifying the flowchart of FIG. 9).

(First Modification)

In the example of FIG. 9, if NO in the discrimination in step S9-7, "MDN Request ON" is displayed in step S9-9 and the received image is outputted in step S9-10.

Figure 12:
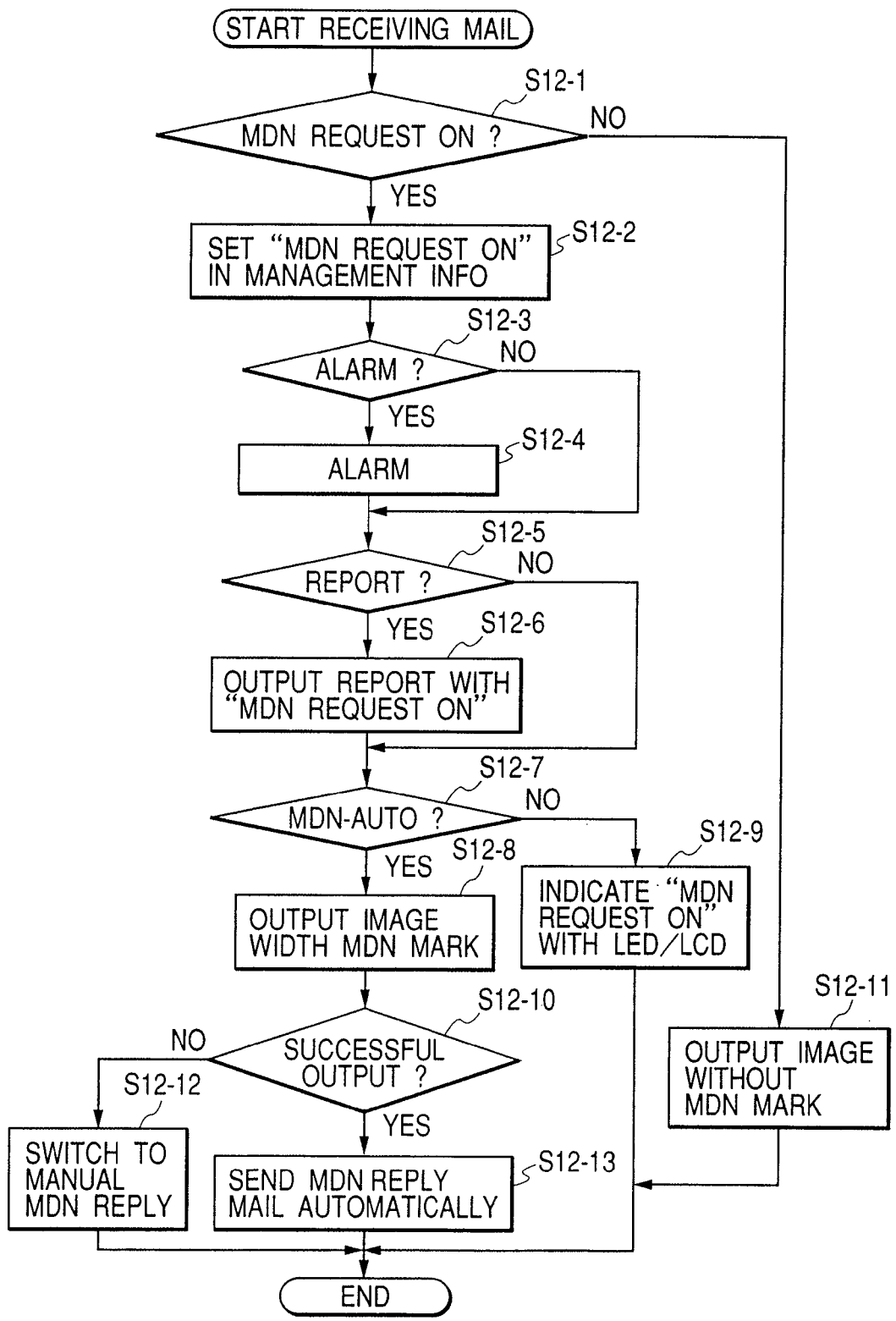
FIG. 12 is a flowchart showing the operation in the case where E-mail of a request header ON of a message disposition notification in the Internet facsimile apparatus in the third embodiment is received.

According to the first modification, if NO in the discrimination in step S12-7 in FIG. 12, "MDN Request ON" is displayed in step S12-9 and, thereafter, the processing routine is once finished without outputting the received image. After that, the received image is outputted in accordance with a predetermined operation by the user and the MDN reply E-mail is sent.

(Second Modification)

In the example of FIG. 9, if YES in the discrimination in step S9-7, first, in step S9-8, the MDN reply E-mail is sent. In step S9-10, the received image is outputted.

In the second modification, if YES in the discrimination in step S12-7 in FIG. 12, in step S12-8, the received image is first outputted. After that, whether it has successfully been outputted or not is discriminated in step S12-10. If YES, the MDN reply E-mail is sent in step S12-13 (a message indicative of the transmission of the MDN reply E-mail is set in the MDN status 2-11). If NO, step S12-12 follows and the sending mode to send the MDN reply E-mail corresponding to the received image which the user tried to output in step S12-10 is switched from the automatic mode to the manual mode. After that, in accordance with a predetermined operation by the user, the received image is outputted and the MDN replay E-mail corresponding to the received image is sent.

According to the first modification, since the outputting operation of the received image and the transmission of the MDN replay E-mail corresponding to the output image are automatically executed in an interlocking relation with a predetermined manual operation of the user, the reliability of the MDN reply E-mail is improved.

According to the second modification, even in case of automatically sending the MDN reply E-mail, a situation such that in spite of the fact that the received image is not successfully outputted, the MDN reply E-mail is automatically sent can be prevented.

Output examples of the reception result report and received image in the second embodiment will now be described.

FIG. 10 is a diagram showing an output example of the reception result report which is outputted every received E-mail in the Internet facsimile apparatus of the second embodiment. In the example of the diagram, an output example of the reception result report responsive to the received E-mail of "MDN Request ON" is shown. Together with "No. (reception number)" (1001) corresponding to the communication management No. 2-2 and "sender address" (1002) showing the E-mail address of the sender, "MDN Request ON" (1003) showing "MDN Request ON" is written in the column of the communication result is printed.

By seeing the display of 1003, the receiver can recognize the fact that the E-mail accompanied by the received image has "MDN Request ON".

FIG. 11 is a diagram showing an output example of an image attached to the received E-mail in the Internet FAX apparatus of the second embodiment. In the example shown in this diagram, an output example of the image attached to the received E-mail of "MDN Request ON" is shown. In a header portion of it, together with an E-mail address 1101 of the sender, an MDN mark 1102 indicative of "MDN Request ON" is printed.

By seeing the display of 1102, the receiver can recognize the fact that the E-mail accompanied by the received image has "MDN Request ON".

The area 1102 becomes a blank area in case of outputting the image attached to the received E-mail without "MDN Request ON".

In the example shown in FIG. 11, the information indicative of "MDN Request ON" is printed in the header portion. However, it can be printed in a footer portion or, if it is possible to discriminate whether the MDN request is ON or OFF, such information can be also displayed by another method.

The operation for recognizing the MDN request by the reception result report outputted from the user or the received image and making a response to the MDN will now be described.

The user who passed near the Internet FAX apparatus of the second embodiment recognizes the reception of the E-mail of "MDN Request ON" from a state of the LCD or LED displayed in step S9-9.

The user who obtained the reception result report outputted in step S9-6 or the received image outputted in step S9-10 recognizes the presence of the MDN request from the information indicative of "MDN Request ON" attached thereto.

The user who recognized "MDN Request ON" executes a predetermined operation by pressing a button of the FAX operation unit 1-2, an MDN reply E-mail is sent by the process shown in step S9-8.

In this instance, it is also possible to display "The sender requested the MDN. Do you send a reply E-mail?YES/NO." and send the reply E-mail for MDN if the user selects YES indicative of the execution of the MDN.

According to the second embodiment as mentioned above, when the user receives the E-mail which requested the Message Disposition Notification (MDN), this fact is shown by the LED/LCD display, alarm, report, further, outputted received image, or the like, thereby making it possible to promote the user to execute the MDN operation.

It is also possible to use a form such that the construction of the Internet FAX apparatus shown in FIG. 1 is allowed to have a Web server function for opening various data to Web clients on the LAN 1-11 and the communication management information or the received image is converted into the XML or HTML format and opened to the user on the LAN 1-11 by the Web server function.

<Third Embodiment>

As a third embodiment, explanation will be made with respect to an embodiment in which means for notifying the user of information regarding whether the MDN E-mail for the received E-mail has already been sent or not is further provided for the Internet FAX apparatus of the second embodiment.

As described in the second embodiment, the information showing whether the MDN request is ON or OFF and the information showing that the reply E-mail responsive to the MDN request has already been sent are set in the MDN status 2-11 of the received E-mail in the communication management information table 2-1 every received E-mail.

Therefore, by reading out the MDN status 2-11 corresponding to the received E-mail, whether the MDN request for the received E-mail is ON or OFF and whether the reply E-mail responsive to the MDN request has been sent or not can be discriminated.

Figure 16:
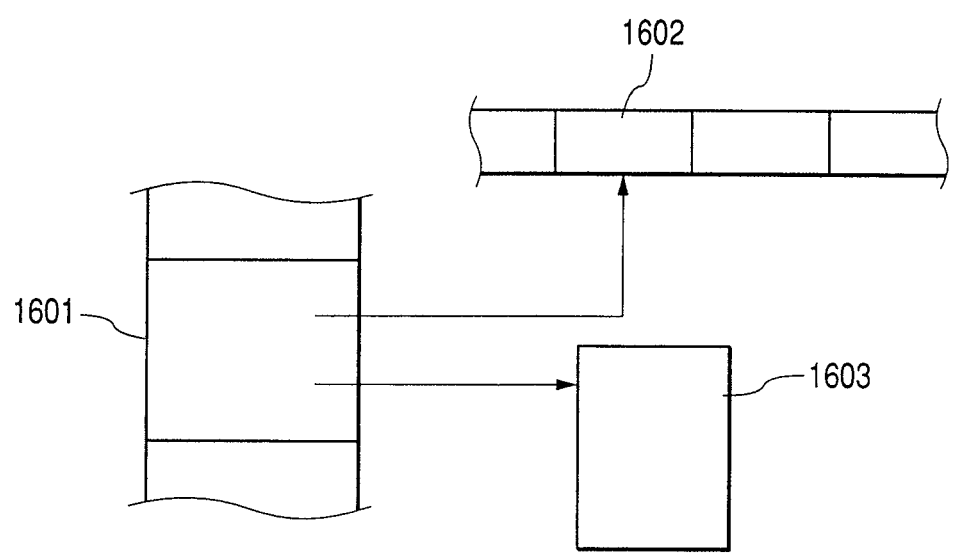
FIG. 16 is a schematic diagram showing a system for managing an image file attached to received E-mail.

FIG. 16 is a schematic diagram showing a system of managing an image file attached to the received E-mail. Storage destination information, information of the sender (E-mail address or the like), reception time information, message ID of the attached E-mail, further, information regarding a format of the image file, and the like of an image file 1603 have been stored in image management information 1601. When the image file is outputted, the necessary information is read out from the image management information and an output of the image is controlled.

Communication management information 1602 of the received E-mail accompanied by the image file can be also specified from the message ID or the like of the E-mail stored in the image management information 1601. Therefore, by reading out the MDN status 2-11 of the specified communication management information from the image file, whether the MDN request for the E-mail accompanied by this image file is ON or OFF and whether the reply E-mail responsive to the MDN request has been sent or not can be discriminated.

Figure 15:
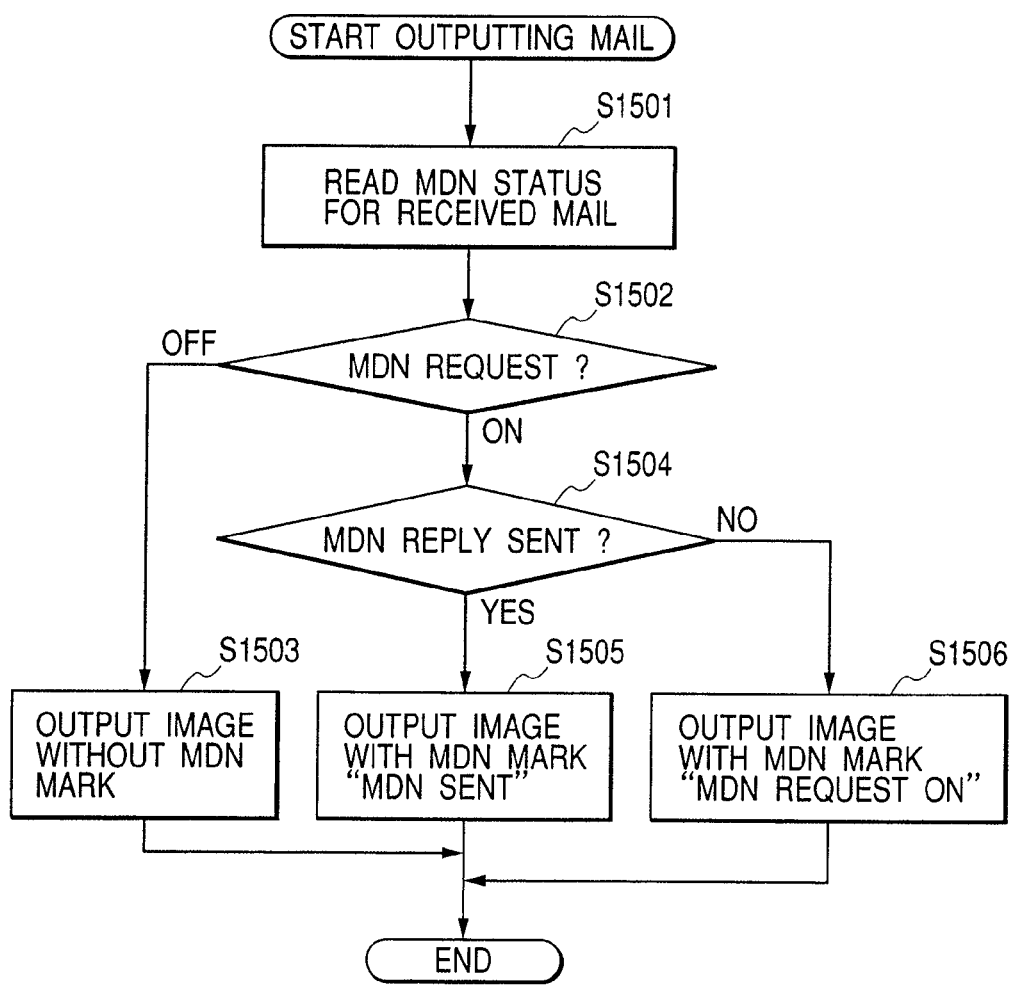
FIG. 15 is a flowchart showing the outputting operation of an attached image file in the Internet facsimile apparatus in the third embodiment.

FIG. 15 is a flowchart showing the outputting operation of the attached image file in an Internet facsimile apparatus of the third embodiment.

First, in step S1501, the communication management information corresponding to the received E-mail accompanied by the image file as an output target is specified and the MDN status 2-11 of the specified communication management information is read out.

In steps S1502 and S1504, the value of the MDN status 2-11 read out in step S1501 is evaluated.

If the MDN request responsive to the received E-mail is OFF in step S1502, step S1503 follows and the image file is outputted without adding the mark regarding the MDN.

If the MDN request responsive to the received E-mail is ON and the MDN reply E-mail has already been sent in accordance with the MDN request in step S1504, step S1505 follows. In step S1502, as shown in FIG. 13, an MDN mark 1301 showing that the MDN reply E-mail has already been sent is added and the image file is outputted.

If NO in step S1504, that is, if the MDN request responsive to the received E-mail is ON and the MDN reply E-mail is not sent in accordance with the request, a mark indicative of such a fact is added and the image file is outputted.

The outputting operation of the attached image file in the Internet FAX apparatus of the third embodiment has been described above.

As mentioned above, since ON/OFF of the MDN request and ON/OFF of the reply to the MDN request are added to the output image of the image file, the user who saw the output image can easily grasp whether he should take an MDN action or not.

As described in the above embodiment, the information showing whether the MDN request is ON or OFF and the information showing that the reply E-mail responsive to the MDN request has already been sent are set in the MDN status of the received E-mail in the communication management information table 2-1 every received E-mail.

Therefore, when the communication management report is outputted, information regarding the MDN request can be also added with respect to the received E-mail.

FIG. 14 is a diagram showing an output example of the communication management-:report in the third embodiment. According to the example shown in the diagram, with respect to the received E-mail of No. 5002, by displaying "MDN Unsent" into the column of the communication mode, it is shown that although the MDN request is ON, nothing is responded yet. With respect to the received E-mail of No. 5003, by displaying "MDN Sent" into the column of the communication mode, it is shown that the MDN request is ON and a response has already been made. With respect to the received E-mail of No. 5005, by displaying "MDN Request OFF" into the column of the communication mode, it is shown that the MDN request is OFF.

As mentioned above, with respect to a plurality of received E-mails, by outputting the information about ON/OFF of the MDN request and the information about ON/OFF of reply of the MDN request as a list, a missing of the MDN can be checked.

<Fourth Embodiment>

The fourth embodiment will now be described with reference to FIGS. 17 to 21.

Figure 17:
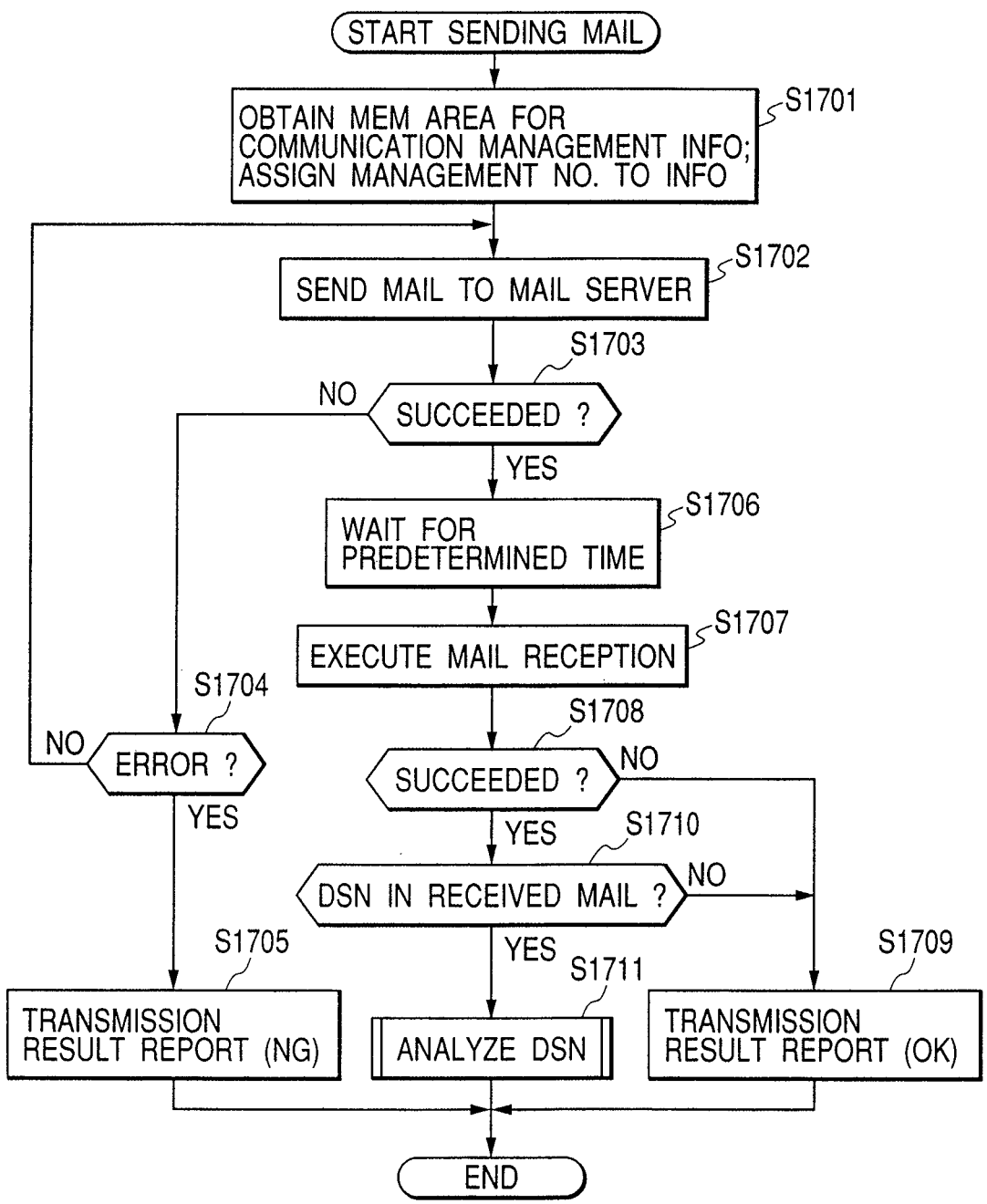
FIG. 17 is a flowchart showing a transmitting procedure of E-mail in an Internet facsimile apparatus in the fourth embodiment.

FIG. 17 is a flowchart showing a sending procedure of the E-mail in an Internet facsimile apparatus of the fourth embodiment.

When the E-mail is sent, as shown in FIG. 17, in step S1701, one area for storing the communication management information is first obtained on the RAM 1-6. An empty area on the communication management information table in the RAM 1-6 is obtained, or if there is no empty area, an area corresponding to the oldest communication management information in the communication management information table is obtained. A communication management number of the E-mail to be sent, a message ID, Internet FAX transmission (I-FAX transmission) as a communication mode, a communication start time, the number of pages, a receiver mail address, and an error code (communication result; unsent) are set into the obtained area.

Subsequently, step S1702 follows and the transmission of the E-mail (I-FAX) accompanied by the read image to the mail server 1-12 is executed. In step S1703, whether the transmission to the mail server 1-12 has succeeded or not is discriminated. If the transmission to the mail server 1-12 failed, step S1704 follows. Whether a cause of the failed transmission to the mail server 1-12 relates to the generation of a transmission error or not is discriminated. If the cause does not relate to the generation of a transmission error here, it is determined that it is impossible to connect to the mail server 1-12 due to a busy status of the server or the like. The processing routine is returned to step S1702 and the E-mail is sent again. On the other hand, if the cause of the failed transmission to the mail server 1-12 relates to the generation of the transmission error, step S1705 follows. An error code corresponding to the communication management information is set by setting the transmission to NG, and the transmission result report indicative of the transmission result is outputted. The processing routine is finished.

If it is decided that the transmission to the mail server 1-12 succeeded in step S1703, step S1706 follows. The apparatus waits for a predetermined time (for example, 30 minutes) in order to start the receiving operation to the mail server 1-12 after the elapse of the predetermined time. During the waiting period of time, a communication time is set into the communication management information. If the communication management report is outputted during the waiting period of time, by writing "--" into the column of the communication result, it is shown that the transmission result is not specified yet.

Subsequently, step S1707 follows and the receiving process to the mail server 1-12 is executed. In step S1708, whether the reception of the E-mail from the mail server 1-12 has succeeded or not is discriminated. If the reception of the E-mail from the mail server 1-12 failed, it is determined that the sent E-mail was successfully sent to the designated destination, and step S1709 follows. The communication management information is updated by setting the transmission to OK. The transmission result report showing this transmission result is outputted, and the processing routine is finished.

On the other hand, if the reception of the E-mail from the mail server 1-12 succeeded, step S1710 follows and whether an E-mail of a delivery status notification (hereinafter, abbreviated to "DSN") is included in the received E-mail or not is discriminated. This discrimination is made by checking whether the following description exists in the field in the received E-mail or not.

Content-Type: multipart/report;
report-type=delivery-status;

The details of the DSN have been specified in FC1894.

When the E-mail of the DSN is not included in the E-mail, it is determined that the sent E-mail was successfully sent to the designated destination, and step S1709 follows. The communication management information is updated by setting the transmission to OK, and the processing routine is finished. If the E-mail of the DSN is included in the received E-mail, step S1711 follows and a DSN analyzing process is executed. The processing routine is finished.

Figure 18:
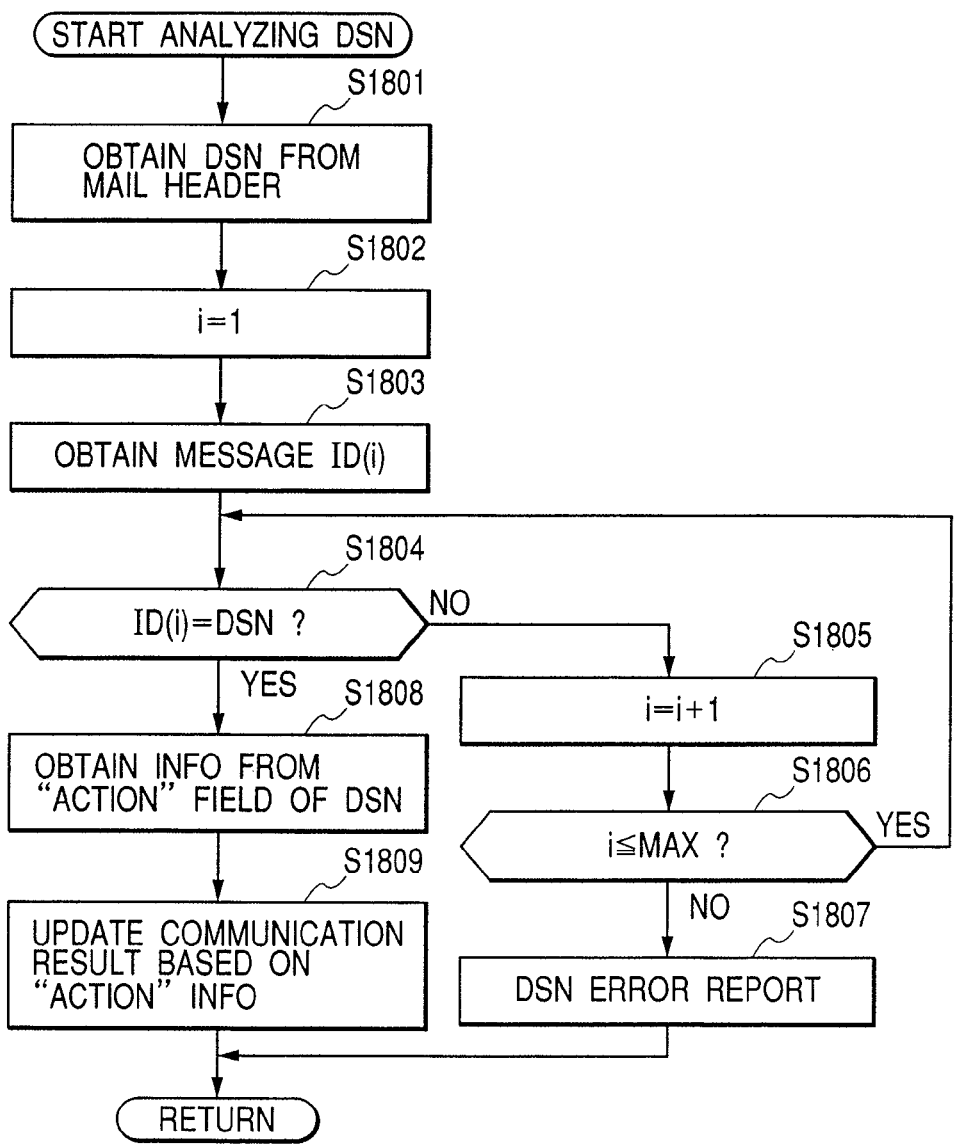
FIG. 18 is a flowchart showing a procedure for a DSN analyzing process in step S1711 in FIG. 17.

The DSN analyzing process in step S1711 will now be described with reference to FIG. 18. FIG. 18 is a flowchart showing a procedure for the DSN analyzing process in step S1711 in FIG. 17.

In the DSN analyzing process, as shown in FIG. 18, first, in step S1801, a message ID (DSN) written in the "Message-ID:" field of the received original E-mail of the DSN is obtained. In step S1802, an index i for searching the communication management information table is set to "1". Step S1803 follows and a message ID (i) of the communication management information i is obtained with reference to the communication management information table.

Subsequently, in step S1804, the obtained message ID (i) is compared with the message ID (DSN), thereby discriminating whether both of them coincide or not. If the message ID (i) and the message ID (DSN) do not coincide, step S1805 follows and the index i is increased by "1". In step S1806, whether the index i is equal to or less than the maximum value (communication management number of the communication management information) in the communication management information table or not is discriminated. If the index i is equal to or less than the maximum value in the communication management information table, the processing routine is returned to step S1804. If the index i exceeds the maximum value in the communication management information table, step S1807 follows. Since the communication management information which coincides with the DSN message does not exist, a DSN error report in which the contents of the received DSN have been written is outputted. This processing routine is finished.

If it is determined in step S1804 that the message ID (i) coincides with the message ID (DSN), step S1808 follows and the information written in an "Action:" field in the DSN is obtained therefrom. In step S1809, the communication result of the corresponding communication management information is updated on the basis of the obtained information. In case of the error, a corresponding error code is set. As mentioned above, one of "failed" (notification of unsent)/ "delayed" (delay)/"delivered (transmission OK)"/"relayed" (relay)/"expanded" (expansion) has been written in the "Action:" field. If "failed" (notification of unsent) has been written, the communication result of the corresponding communication management information is updated by setting the transmission result to NG, and the transmission result report showing the transmission result is outputted. If "delayed" (delay) has been written, the communication result of the corresponding communication management information is set to "transmission result unsent". If "delivered" (transmission OK) has been written, the transmission result is set to OK. If "relayed" (relay) has been written, the transmission result is set to OK (relay). If "expanded" (expansion) has been written, the transmission result is set to OK (broadcasting). In this manner, the communication result is updated, respectively. The transmission result report showing the transmission result is outputted, respectively. The present processing routine is finished.

An output example of the communication management report will now be described with reference to FIG. 19.

The communication management report is a report describing one list of the communication management information stored in the communication management information table in the RAM 1-6 and can be outputted from the record unit 1-4 by the inputting operation of the FAX operation unit 1-2. For example, as shown in FIG. 19, the communication management report includes: start (start time); receiver (partner destination); sender (name of sender); No. (communication management number); mode (communication mode); pages (the number of pages which are sent or received); and result (communication result). In the case where the E-mail has been sent, "send I-FAX" is written into the column of the communication mode.

In the communication management report, there are "send I-FAX" of three cases. With respect to the E-mail (communication management number 0002) of the first case, the E-mail is received from the mail server 1-12 after the elapse of a predetermined time. However, since the DSN is not received (communication management number 5002), OK is written into the column of the communication result. With respect to the E-mail (communication management number 0003) of the second case, since the E-mail is received from the mail server 1-12 after the elapse of a predetermined time, and the DSN (unsent) is received (communication management numbers 5003 and 5004), NG is written into the column of the communication result. With respect to the E-mail (communication management number 0004) of the third case, since a predetermined time does not elapse from the transmission and whether the E-mail is received from the mail server 1-12 or not is obscure, "--" is written into the column of the communication result.

Examples of the transmission result report which is outputted in step S1705 or S1709 will now be described with reference to FIGS. 20 and 21. FIG. 20 is a diagram showing the example of the transmission result report which is outputted in step S1705 in FIG. 17. FIG. 21 is a diagram showing the example of the transmission result report which is outputted in step S1709 in FIG. 17.

If a transmission error is generated upon sending of the E-mail to the mail server 1-12 and the transmission is finished as an error (step S1704 in FIG. 17), a corresponding error code is set into the communication management information by setting the transmission to NG, and at the same time, the transmission result report showing the transmission result is outputted (step S1705). For example, as shown in FIG. 21, this transmission result report includes the communication result together with a message indicative of the error end of the transmission, and NG showing the transmission result and the error code have been written in the column of the communication result.

When the mail is not received from the mail server 1-12 or when the E-mail of the corresponding DSN is not included in the E-mail (steps S1708 and S1710 in FIG. 17), it is determined that the sent E-mail has successfully been sent to the designated destination, and the transmission result report showing the transmission result of transmission OK is outputted (step S1709). For example, as shown in FIG. 20, together with the message indicative of the successful end of the transmission, the transmission result is included in the transmission result report. OK indicative of the transmission result has been written in the column of the communication result.

As mentioned above, according to the embodiment, whether the DSN (Delivery Status Notification) for the sent E-mail has been received from the mail server 12 after the elapse of a predetermined period of time from the transmission of the E-mail or not is discriminated. If this DSN is received, the contents in the communication management information of the E-mail which received the DSN are updated in accordance with the DSN. Therefore, the user can certainly know whether the E-mail sent via the E-mail server has successfully been sent to the receiver or not and, moreover, the reliability for the facsimile transmission via the Internet can be improved.

Since the transmission result according to the DSN is described in the communication management report, the transmission result information such as "failed", "delayed", "delivered", "relayed", "broadcasted", etc. can be derived from the description.

<Fifth Embodiment>

Figure 22:
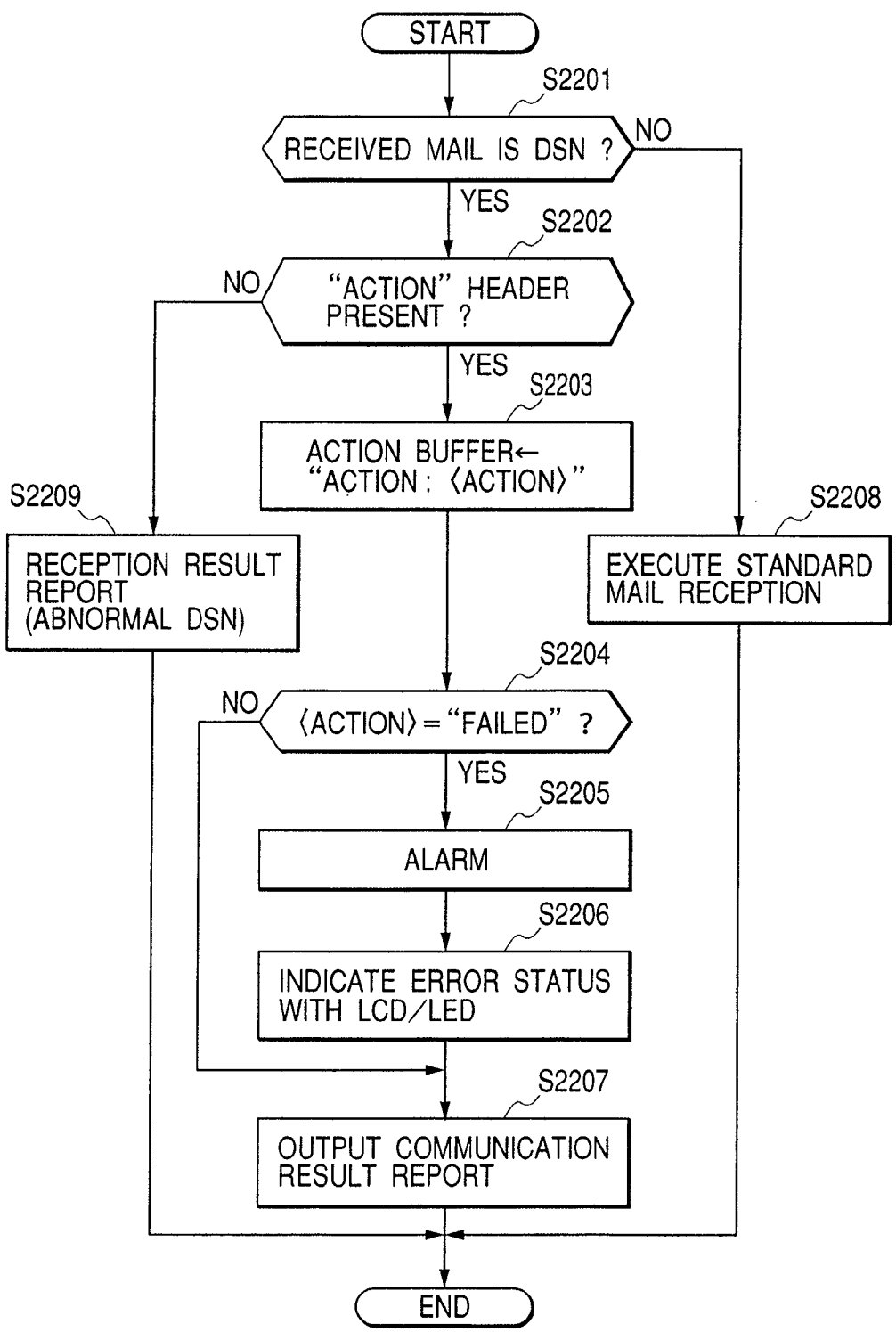
FIG. 22 is a flowchart showing a procedure for a mail receiving process of a DSN in an Internet facsimile apparatus in the fifth embodiment.

The fifth embodiment of the invention will now be described with reference to FIGS. 22 to 24. FIG. 22 is a flowchart showing a procedure for a mail receiving process of the DSN in a facsimile apparatus according to the fifth embodiment of the invention. FIG. 23 is a diagram showing an example of the transmission result report which is outputted in step S2207 in FIG. 22. FIG. 24 is a diagram showing an example of the reception result report which is outputted in step S2209 in FIG. 22. Since the fifth embodiment has substantially the same construction as that of the fourth embodiment, a description of its construction is omitted here.

According to the embodiment, when the DSN (Delivery Status Notification) returned from the mail server 1-12 in response to the sent E-mail is received, the contents of the received DSN is analyzed. When it is detected by this analysis that the received DSN indicates "not delivered" of the sent E-mail, error notification information indicative of "not delivered" of the sent E-mail is outputted. The user is notified of this error notification information by generating a warning sound from the speaker of the FAX operation unit 1-2. The user is also notified of this error notification information by a method whereby it is printed and outputted by the record unit 1-4 or a method whereby it is displayed by using the LCD or LED of the FAX operation unit 1-2.

In the embodiment, after the E-mail accompanied by the read image is sent, the mail receiving process from the mail server 1-12 is started. When the E-mail from the mail server 1-12 is received, as shown in FIG. 22, whether the E-mail received from the mail server 1-12 is the E-mail including the DSN or not is first discriminated in step S2201. This discrimination is made by checking whether the following description exists in the field in the received E-mail or not in a manner similar to the fourth embodiment.

Content-Type: multipart/report;
    report-type=delivery-status;

If the E-mail received from the mail server 1-12 is not the E-mail including the DSN, step S2208 follows and the standard mail receiving process is executed. In the standard mail receiving process, the print output, transfer, or the like of the received E-mail is executed. The present processing routine is finished.

If the E-mail received from the mail server 1-12 is the E-mail including the DSN, step S2202 follows and the presence or absence of the description "Action:<action>" is discriminated. If such a description is absent, it is determined that the illegal DSN has been received, and step S2209 follows. The communication result report is outputted from the record unit 1-4. The reception result report indicative of the abnormal DSN reception is outputted. The details of the reception result report will be explained hereinlater. The present processing routine is finished.

If the description "Action:<action>" is present in the DSN, step S2203 follows. A character string described in "Action:<action>" is obtained and stored into an action character string buffer in the RAM 1-6. Step S2204 follows and whether the obtained action character string is "failed" or not is discriminated. If the obtained action character string is "failed", since this "failed" indicates "not delivered", the processing routine advances to step S2205.

In step S2205, a warning sound is generated from the speaker of the FAX operation unit 1-2 in order to notify the user of the face that the sent E-mail does not reach the designated destination. In step S2206, information to specify the E-mail which received the "failed" notification by the DSN, for example, the receiver mail address or the like is displayed by the LCD of the FAX operation unit 1-2. At the same time, the LED of the FAX operation unit 1-2 is lit on in order to indicates the error state. Step S2207 follows and the communication result report for the E-mail which received the "failed" notification by the DSN is outputted from the record unit 1-4. The fact that the "failed" notification was received by the DSN and the transmission result report describing the information regarding the E-mail are outputted. The details of the transmission result report will be described hereinlater. The present processing routine is finished.

If it is decided in step S2204 that the obtained action character string is not "failed", this means that the obtained action character string is one of "delayed" (delay)/"delivered" (transmission OK)/"relayed" (relay)/"expanded" (expansion), steps S2205 and S2206 are skipped and step S2207 follows. The communication result report for the E-mail which received this DSN is outputted. In this instance, the transmission result report describing one of "delayed" (delay)/"delivered" (transmission OK)/"relayed" (relay)/"expanded" (expansion) shown by the DSN is outputted. The present processing routine is finished.

If the "failed" notification is received by the DSN (step S2204), for example, the transmission result report shown in FIG. 23 is outputted (step S2207) in response to the above E-mail. The fact that the error was notified by the mail server and the information (reception No., receiver address, receiver name, start time, duration (communication time), and the number of pages) regarding the E-mail whose error was notified, and the communication result of NG have been described in the transmission result report.

If the illegal DSN is received from the mail server 1-12 (step S2202), a reception result report indicative of the abnormal DSN reception shown in, for example, FIG. 24 is outputted (step S2209). The fact that the received mail is the illegal DSN mail, information (here, reception No., sender address, sender name, start time, duration (communication time), the number of pages) regarding the E-mail corresponding to this mail, and the communication result indicative of the reception of the DSN without the "Action:" header have been described in the reception result report.

As mentioned above, in the embodiment, when the DSN (Delivery Status Notification) returned from the mail server 1-12 in response to the sent E-mail is received, the contents of the received DSN are analyzed. If it is detected by this analysis that the received DSN is the "failed" notification of the sent E-mail, error notification information indicative of "failed" notification of the sent E-mail is generated by the speaker or the LCD and LED of the FAX operation unit 1-2 or outputted by using the record unit 1-4. Therefore, the user can certainly recognize the fact that the sent E-mail does not reach the designated destination. Moreover, the reliability for the facsimile transmission through the Internet can be improved.

Although the error notification information is generated by the speaker or the LCD and LED of the FAX operation unit 1-2 or outputted by using the record unit 1-4, the error notification information can be also generated by combining one or more of them.

<Sixth Embodiment>

Figure 25:
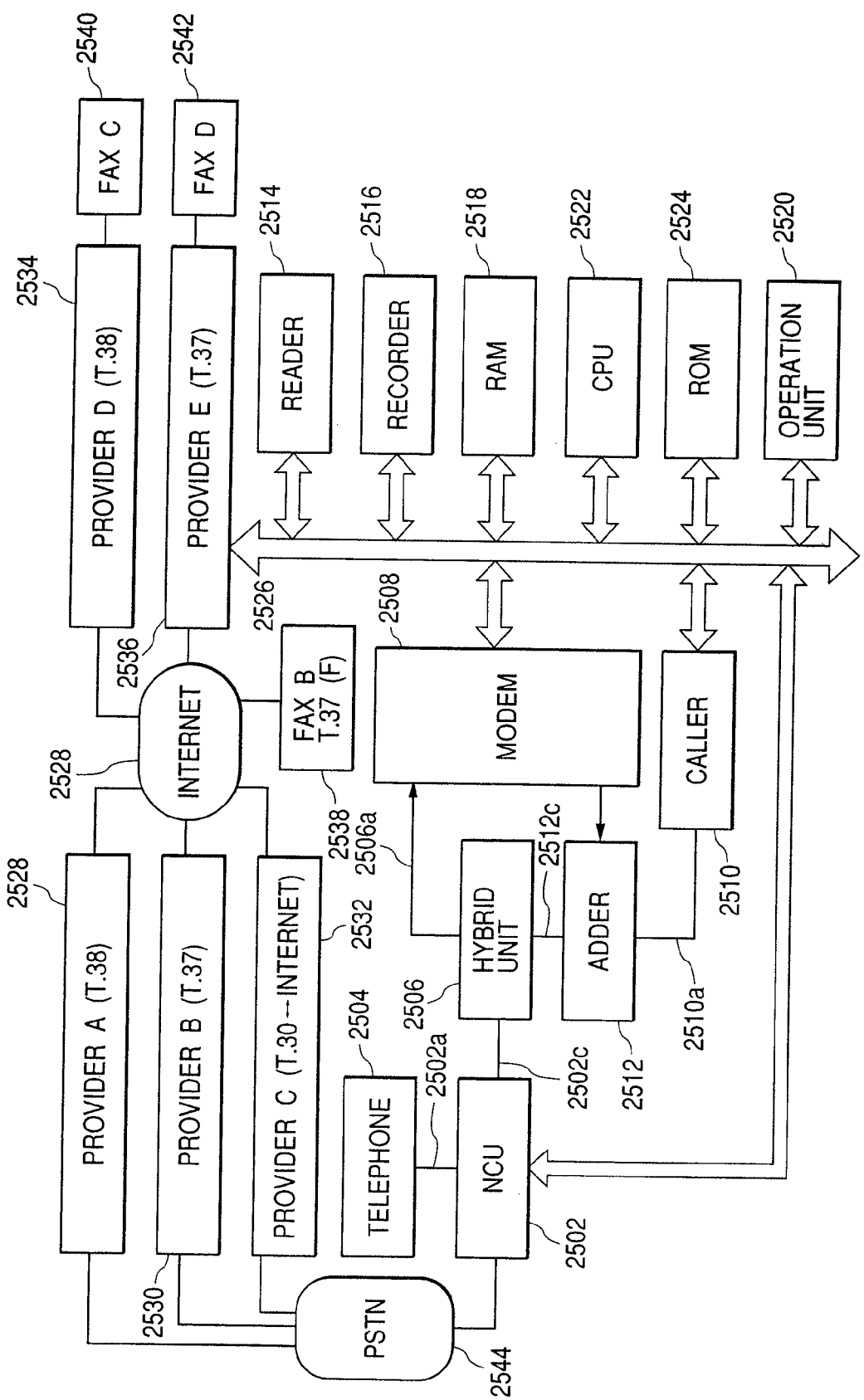
FIG. 25 is a block diagram showing a construction of an Internet facsimile apparatus in the sixth embodiment.

The sixth embodiment of the invention will now be described with reference to FIGS. 25 and 26. FIG. 25 is a block diagram showing a construction of an Internet facsimile apparatus according to the sixth embodiment of the invention. FIG. 26 is a diagram showing an example of a communication management report which is outputted from the Internet FAX apparatus in FIG. 25.

As shown in FIG. 25, the Internet FAX apparatus has a network control unit (hereinafter, abbreviated to "NCU") 2502 connected to a public line network (PSTN) 2544. In order to use the NCU 2502 for data communication with a telephone network or the like, the NCU 2502 performs a connection control of a telephone exchange network by connecting to a line terminal of the telephone network, or the like, switches to a data communication path, and selectively switches a connection (CML OFF) between the public line network 2544 and a telephone 2504 and a connection (CML ON) between the public line network 2544 and a hybrid unit 2506. The NCU 2502 and telephone 2504 are connected by a signal line 2502a. The NCU 2502 and hybrid unit 2506 are connected by a signal line 2502c. The switching operation of the NCU 2502 is controlled by a CPU 2522, which will be explained hereinlater. In the normal state, the connection between the public line network 2544 and telephone 2504 is selected.

The hybrid unit 2506 separates a transmission signal from a facsimile transmission system which is transmitted through the public line network 2544 and a reception signal to a facsimile reception system which is received through the public line network 2544.

The facsimile transmission system has a reader 2514. The reader 2514 reads information of an original and outputs its read data to a bus 2526. The read data is once stored into an RAM 2518 and, thereafter, it is read out by the CPU 2522 and encoded. The encoded data is outputted to a modem 2508 through the bus 2526.

The modem 2508 executes a modulating process to the encoded data inputted through the bus 2526, thereby forming a modulation signal. The modem 2508 executes a demodulating process to the reception signal fetched from the hybrid unit 2506 through a signal line 2506a, thereby forming demodulation data. The modulating process and demodulating process are executed on the basis of the ITU-T recommendation V.8, V.21, V.27ter, V.29, V.17, and V.34. Contents of the modulating and demodulating processes by the modem 2508 are instructed by signals which are supplied from the CPU 2522 through the bus 2526. A transmitting mode is determined by the instructed modulating and demodulating processes. As instructions which are supplied from the CPU 2522 to the modem 2508 through the bus 2526, there are instructions regarding a sending-mode, a receiving mode, a transmission speed, and the like.

The modulation signal formed by the modem 2508 is outputted to an adder 2512 through a signal line 2508a. The adder 2512 adds the modulation signal from the modem 2508 and a signal inputted from a caller 2510 through a signal line 2510a and outputs a resultant addition signal to the hybrid unit 2506 through a signal line 2512a. The caller 2510 outputs a selection signal of a DTMF in accordance with telephone number information inputted from the CPU 2522 through the bus 2526. The hybrid unit 2506 sends the addition signal from the adder 2512 as a transmission signal to the public line network 2544 via the NCU 2502.

On the other hand, in the facsimile reception system, the signal received from a partner apparatus through the NCU 2502 is outputted from the hybrid unit 2506 to the modem 2508 through the signal line 2506a. As mentioned above, the modem executes the demodulating process to the reception signal fetched through the signal line 2506a, thereby forming the demodulation data. The demodulation data formed by the modem 2508 is sent to the CPU 2522 through the bus 2526. The CPU 2522 executes a process such as decoding or the like to the demodulation data, stores the decoded data into the RAM 2518 through the bus 2526, or outputs it to a recorder 2516 through the bus 2526. The recorder 2516 sequentially records the data fetched through the bus 2526 onto a recording paper every line.

The CPU 2522 controls the whole apparatus in accordance with a control program stored in an ROM 2524 and executes a transmission control procedure. The RAM 2518 is used as a work area for the control by the CPU 2522. An area to store communication management information table, which will be explained hereinlater, is provided in the RAM 2518. Further, an area to store information which is received into a memory is provided in the RAM 2518.

An instruction is inputted to the CPU 2522 through an operation unit 2520. The operation unit 2520 has a function setting key, one-touch keys, abbreviation dial keys, ten-key, a start key, a stop key, various information registering keys, and the like. When the key operation is executed, corresponding information is inputted to the CPU 2522 through the bus 2526. A display unit (not shown) for displaying an apparatus state, a destination, its telephone number information, a warning message, and the like is provided for the operation unit 2520.

A plurality of providers (A, B, C) 2528, 2530, and 2532 are enclosed in the public line network 2544. The providers (A, B, C) 2528, 2530, and 2532 can be connected to providers (D, E) 2534 and 2536 and a facsimile apparatus (FAXB) 2538 through an Internet 2546 and can be also connected to facsimile apparatuses (FAXC, FAXD) 2540 and 2542 through the providers (D, E) 2534 and 2536.

The providers A and D support the facsimile communication through the Internet in a real-time manner according to the ITU-T T.38. The provider B supports the facsimile communication through the Internet in a simple mode and a full mode according the ITU-T T.37. The provider C supports the facsimile communication according the ITU-T T.30 with the public line network 2544 and supports the facsimile communication in the simple mode according the ITU-T T.37 with the Internet 2546. The provider E supports the facsimile communication in the full mode according the ITU-T T.37. In the simple mode of the ITU-T T.37 through the Internet, an ability confirmation and a delivery status notification cannot be performed with the partner apparatus upon facsimile transmission through the Internet. According to the full mode of the ITU-T T.37 and the ITU-T T.38, an ability confirmation and a delivery status notification cannot be performed with the partner apparatus upon facsimile transmission.

In the embodiment, the apparatus has a plurality of communicating functions for performing a facsimile transmission via each provider A, B, C, D, or E. When the facsimile transmission via each provider A, B, C, D, or E is executed by each communicating function, communication management information of the facsimile transmission is formed and stored into communication management table in the RAM 2518. When the facsimile transmission is executed through the Internet according to the ITU-T T.37, communication management information describing the fact that it is necessary to confirm the communication result of the facsimile transmission is formed. The communication management information of up to 40 cases can be stored into the communication management table. A list of the communication management information stored in the communication management table can be outputted as a communication management report by the recorder 2516.

For example, as shown in FIG. 26, the communication management report includes items such as communication number, identification information of the transmission or reception, receiver information, communication result, and communication whose confirmation is needed. For example, the facsimile transmission of each of the communication Nos. "0002", "0005", and "0008" is a transmission such that although the transmission to the corresponding provider was successfully finished, whether the information has reached the receiver or not cannot be discriminated. For those transmissions, OK is described in the column of each communication result. However, since it is actually impossible to discriminate whether the information reached the receiver or not, a mark "○" indicative of the necessity of the confirmation about whether the information has reached the receiver or not is written in the column of each communication in which the confirmation is necessary.

With respect to the transmission of the communication No. "0002", in case of the facsimile transmission in the simple mode of the ITU-T T.37, the mark "○" indicative of the necessity of the confirmation about whether the information has reached the receiver or not is written, and in case of the facsimile transmission in the full mode of the ITU-T T.37, a mark "-" indicative of the unnecessity of the confirmation about whether the information has reached the receiver or not is written.

As mentioned above, in the embodiment, when the facsimile transmission is executed through the Internet of the ITU-T T.37, the communication management information describing the fact that it is necessary to confirm the communication result of the facsimile transmission is formed. Therefore, with respect to the facsimile transmission in which whether the information has reached the receiver or not cannot be discriminated among the facsimile transmissions through the Internet, the necessity of the confirmation about whether the information has reached the receiver or not can be easily known.

<Another Embodiment>

Naturally, the function which the Internet FAX apparatus of the first embodiment has and the function which the Internet FAX apparatus of the second embodiment has can be realized by one apparatus.

Although the embodiments have been described with respect to one apparatus such as an Internet FAX apparatus, the invention is also applied to an image communication system comprising a plurality of apparatuses such as computer apparatus, scanner apparatus, printer apparatus, and the like.

Although the programs for realizing the functions described in the embodiments have been stored in the ROM 1-5, those functions can be also accomplished by a method whereby a memory medium in which program codes of software for realizing the functions have been recorded is supplied to a system or an apparatus and a CPU of the system or apparatus reads out the program codes stored in the memory medium and executes the actual processes based on the read program codes.

In this case, the program codes themselves read out from the memory medium realize the functions of the embodiments mentioned above. The memory medium in which the program codes have been stored constructs the present invention. As a memory medium for supplying the program codes, for example, it is possible to use a floppy disk, an optical disk, a magnetooptic disk, a CD-ROM, a CD-R, a magnetic tape, a non-volatile memory card, an ROM, or the like.

Obviously, the invention incorporates not only a case where the CPU executes the read-out program codes, so that the functions of the embodiments mentioned above are realized, but also a case where on the basis of instructions of the program codes, an OS (operating system) or the like which is operating executes a part or all of the actual processes, and the functions of the embodiments mentioned above are realized by those processes.

Further, the invention also incorporates a case where the program codes read out from the memory medium are written into a memory provided for a function expanding board inserted into the apparatus or a function expanding unit connected to the apparatus and, thereafter, on the basis of instructions of the program codes, a CPU or the like provided for the function expanding board or function expanding unit executes a part or all of the actual processes, and the functions of the embodiments mentioned above are realized by those processes.

What is claimed is:

1. An image communicating apparatus which is capable of performing E-mail communication via a network, comprising:
  a processor for executing process steps, and a memory for storing process steps executed by the processor, wherein the process steps cause the processor to function as:
  a transmitting unit, configured to send an E-mail accompanied by an image file to a transmission destination;
  an adding unit, configured to add, to the sent E-mail, information for requesting a message disposition notification for the sent E-mail;
  a receiving unit, configured to receive an E-mail and to receive a message disposition notification for the sent E-mail;
  a managing unit, configured to manage transmission management information of the sent E-mail; and
  an analyzing unit, configured to analyze the received message disposition notification, wherein the analysis includes a search of the received message disposition notification for disposition information which indicates how the sent E-mail was processed by a receiver of the sent E-mail, and an analysis of the disposition information so as to obtain a determination based on the disposition information of whether the result of sending the sent E-mail was successful or was not successful;
  wherein the managing units sets the determination to the transmission management information for the sent E-mail, whereby the transmission management information for sent E-mail thereby indicates that the result of sending the sent E-mail was successful or not successful.

2. An image communicating apparatus according to claim 1, wherein the adding unit adds, to a header of the sent E-mail, the information for requesting the message disposition notification to the transmission destination of the sent E-mail.

3. An image communicating apparatus according to claim 1, wherein, after the transmitting unit sends the sent E-mail, the managing unit sets, to the transmission management information, information indicating that the message disposition notification is not yet received, until the receiving unit receives the message disposition notification.

4. An image communicating apparatus according to claim 1, wherein the sent E-mail sent by the transmitting unit is sent to the transmission destination via an E-mail server, and wherein the transmission management information includes information indicating a result of the sending of the sent E-mail sent by the transmitting unit to the E-mail server.

5. An image communicating apparatus according to claim 1, further comprising an output unit, configured to visibly output the transmission management information.

6. An image communicating apparatus according to claim 5, wherein the output unit visibly outputs a transmission result report.

7. An image communicating apparatus according to claim 5, wherein the output unit visibly outputs a communication management report.

8. The image communicating apparatus according to claim 1, wherein the disposition information included in the message disposition notification for the sent E-mail includes at least one status indicator out of a plurality of possible status indicators, and wherein the analyzing unit obtains the determination that the result of the sending of the sent E-mail was successful when the message disposition notification includes certain ones of the possible status indicators, and obtains the determination that the result of the sending of the sent E-mail was not successful when the message disposition notification includes certain other ones of the possible status indicators.

9. The image communicating apparatus according to claim 1, wherein there are at least six different possible indications in the disposition information included in the message disposition notification which indicate how the sent E-mail was processed by the receiver of the sent E-mail, and
the determination of whether the result of sending the sent E-mail was successful or was not successful is based on which of the indications is in the received disposition information.

10. An image communicating apparatus according to claim 1, wherein the sent E-mail includes a message identifier and wherein the message identifier forms part of the transmission management information for the sent E-mail;
wherein the analysis of the received message disposition notification includes a search for a message identifier in the received message disposition notification and a search of a stored plurality of transmission management information so as to retrieve transmission management information having a message identifier matching the message identifier in the received message disposition notification; and
wherein it is the retrieved transmission management information that is set by the determination.

11. A control method used in an image communication apparatus which is capable of performing E-mail communication via a network, the method comprising:
adding, to an E-mail, information for requesting a message disposition notification for the E-mail;
sending the E-mail to which the information for requesting the message disposition notification was added to a transmission destination of the sent E-mail, wherein the E-mail is sent accompanied by an image file;
managing transmission management information of the sent E-mail;
receiving a message disposition notification for the sent E-mail;
analyzing the received message disposition notification, wherein the analysis includes a search of the received message disposition notification for disposition information which indicates how the sent E-mail was processed by a receiver of the sent E-mail, and an analysis of the disposition information so as to obtain a determination based on the disposition information of whether the result of sending the sent E-mail was successful or was not successful; and
setting the determination to the transmission management information for the sent E-mail, whereby the transmission management information for the sent E-mail thereby indicates that the result of sending the sent E-mail was successful or not successful.

12. The control method according to claim 11, wherein the disposition information included in the message disposition notification for the sent E-mail includes at least one status indicator out of a plurality of possible status indicators, and wherein the determination that the result of the sending of the sent E-mail was successful is obtained when the message disposition notification includes certain ones of the possible status indicators, and wherein the determination that the result of the sending of the sent E-mail was not successful is obtained when the message disposition notification includes certain other ones of the possible status indicators.

13. The control method according to claim 11, wherein
there are at least six different possible indications in the disposition information included in the received message disposition notification which indicate how the sent E-mail was processed by the receiver of the sent E-mail, and
the determination of whether the result of sending the sent E-mail was successful or was not successful is obtained based on which of the indications is in the received disposition information.

14. The control method according to claim 11, wherein the sent E-mail includes a message identifier and wherein the message identifier forms part of the transmission management information for the sent E-mail;
wherein the analysis of the received message disposition notification includes a search for a message identifier in the received message disposition notification and a search of a stored plurality of transmission management information so as to retrieve transmission management information having a message identifier matching the message identifier in the received message disposition notification; and
wherein it is the retrieved transmission management information that is set by the determination.

15. A non-transitory computer-readable storage medium which stores therein a computer program to cause a computer to execute a control method used in an image communication apparatus which is capable of performing E-mail communication via a network, the method comprising:
adding, to an E-mail, information for requesting a message disposition notification for the E-mail;
sending the E-mail to which the information for requesting the message disposition notification was added to a transmission destination of the sent E-mail, wherein the E-mail is sent accompanied by an image file;
managing transmission management information of the sent E-mail;
receiving a message disposition notification for the sent E-mail;
analyzing the received message disposition notification, wherein the analysis includes a search of the received message disposition notification for disposition information which indicates how the sent E-mail was processed by a receiver of the sent E-mail, and an analysis of the disposition information so as to obtain a determination based on the disposition information of whether the result of sending the sent E-mail was successful or was not successful; and
setting the determination to the transmission management information for the sent E-mail, whereby the transmission management information for the sent E-mail thereby indicates that the result of sending the sent E-mail was successful or not successful.

16. The non-transitory computer-readable storage medium according to claim 15, wherein the disposition information included in the message disposition notification for the sent E-mail includes at least one status indicator out of a plurality of possible status indicators, and wherein the determination that the result of the sending of the sent E-mail was successful is obtained when the message disposition notification includes certain ones of the possible status indicators, and wherein the determination that the result of the sending of the sent E-mail was not successful is obtained when the message disposition notification includes certain other ones of the possible status indicators.

17. The non-transitory computer-readable storage medium according to claim 15, wherein there are at least six different possible indications in the disposition information included in the received message disposition notification which indicate how the sent E-mail was processed by the receiver of the sent E-mail, and the determination of whether the result of sending the sent E-mail was successful or was not successful is obtained based on which of the indications is in the received disposition information.

18. The non-transitory computer-readable storage medium according to claim 15, wherein the sent E-mail includes a message identifier and wherein the message identifier forms part of the transmission management information for the sent E-mail;

wherein the analysis of the received message disposition notification includes a search for a message identifier in the received message disposition notification and a search of a stored plurality of transmission management information so as to retrieve transmission management information having a message identifier matching the message identifier in the received message disposition notification; and wherein it is the retrieved transmission management information that is set by the determination.

19. An image communicating apparatus which is capable of performing E-mail communication via a network, comprising:

a processor for executing process steps, and a memory for storing process steps executed by the processor, wherein the process steps cause the processor to function as:

a transmitting unit, configured to send an E-mail accompanied by an image file to a transmission destination;

an adding unit, configured to add, to the sent E-mail, information for requesting a message disposition notification for the E-mail sent by the transmitting unit to the transmission destination of the sent E-mail;

a receiving unit, configured to receive an E-mail and to receive a message disposition notification for the sent E-mail;

a managing unit, configured to manage transmission management information of the sent E-mail, wherein the transmission management information includes a result field which is set to a first value before receipt of the message disposition notification for the sent E-mail; and an update unit, configured to update the result field in the transmission management information for the sent E-mail to a second value indicating success of the sending of the sent E-mail or indicating not-success of the sending of the sent E-mail;

wherein the result field is updated to the second value based on an analysis of disposition information in the received message disposition notification so as to obtain a determination based on the disposition information of whether the result of sending the sent E-mail was successful or was not successful.

20. A control method used in an image communication apparatus which is capable of performing E-mail communication via a network, the method comprising:

adding, to an E-mail, information for requesting a message disposition notification for the E-mail;

sending the E-mail to which the information for requesting the message disposition notification was added to a transmission destination of the sent E-mail, wherein the E-mail is sent accompanied by an image file;

managing transmission management information of the sent E-mail, wherein the transmission management information includes a result field;

receiving a message disposition notification for the sent E-mail;

setting the result field of the transmission management information to a first value before receipt of the message disposition notification for the sent E-mail; and updating the result field in the transmission management information for the sent E-mail to a second value indicating success of the sending of the sent E-mail or indicating not-success of the sending of the sent E-mail;

wherein the result field is updated to the second value based on an analysis of disposition information in the received message disposition notification so as to obtain a determination based on the disposition information of whether the result of sending the sent E-mail was successful or was not successful.

21. A non-transitory computer-readable storage medium which stores therein a computer program to cause a computer to execute a control method used in an image communication apparatus which is capable of performing E-mail communication via a network, the method comprising:

adding, to an E-mail, information for requesting a message disposition notification for the E-mail;

sending the E-mail to which the information for requesting the message disposition notification was added to a transmission destination of the sent E-mail, wherein the E-mail is sent accompanied by an image file;

managing transmission management information of the sent E-mail, wherein the transmission management information includes a result field;

receiving a message disposition notification for the sent E-mail;

setting the result field of the transmission management information to a first value before receipt of the message disposition notification for the sent E-mail; and updating the result field in the transmission management information for the sent E-mail to a second value indicating success of the sending of the sent E-mail or indicating not-success of the sending of the sent E-mail;

wherein the result field is updated to the second value based on an analysis of disposition information in the received message disposition notification so as to obtain a determination based on the disposition information of whether the result of sending the sent E-mail was successful or was not successful.

* * * * *